United States Patent
Mendes et al.

(10) Patent No.: US 11,055,638 B1
(45) Date of Patent: Jul. 6, 2021

(54) METHOD FOR SHARED VEHICLE UTILIZATION MANAGEMENT

(71) Applicant: Geotab Inc., Oakville (CA)

(72) Inventors: Christopher J. Mendes, Kitchener (CA); Stephen Michael Fox, Oakville (CA); Benjamin John Gordon Gaffney, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/117,366

(22) Filed: Dec. 10, 2020

Related U.S. Application Data

(60) Provisional application No. 63/012,536, filed on Apr. 20, 2020.

(51) Int. Cl.

| | |
|---|---|
| *G06Q 10/00* | (2012.01) |
| *H04W 4/40* | (2018.01) |
| *B60R 25/25* | (2013.01) |
| *G06Q 10/02* | (2012.01) |
| *G06F 21/32* | (2013.01) |
| *B60R 25/24* | (2013.01) |
| *G07C 5/08* | (2006.01) |
| *G07C 5/00* | (2006.01) |

(52) U.S. Cl.
CPC .......... *G06Q 10/02* (2013.01); *B60R 25/241* (2013.01); *B60R 25/25* (2013.01); *G06F 21/32* (2013.01); *G07C 5/008* (2013.01); *G07C 5/0841* (2013.01); *H04W 4/40* (2018.02)

(58) Field of Classification Search
CPC ......... G06Q 10/02; H04W 4/40; B60R 25/25; B60R 25/241; G06F 21/32; G07C 5/008; G07C 5/0841
See application file for complete search history.

(56) References Cited

U.S. PATENT DOCUMENTS

| | | | |
|---|---|---|---|
| 8,841,987 B1 | 9/2014 | Stanfield et al. | |
| 10,134,286 B1 * | 11/2018 | Elswick | ................ G06Q 50/30 |
| 10,504,366 B1 | 12/2019 | Dagley et al. | |
| 2013/0321178 A1 | 12/2013 | Jameel et al. | |
| 2013/0325521 A1 | 12/2013 | Jameel et al. | |
| 2014/0266594 A1 | 9/2014 | Reiser | |
| 2014/0309862 A1 | 10/2014 | Ricci | |
| 2014/0358896 A1 | 12/2014 | Camacho et al. | |
| 2015/0149086 A1 * | 5/2015 | Alberth, Jr. | ............. H04W 4/40 |
| | | | 701/519 |
| 2015/0161832 A1 | 6/2015 | Esselink et al. | |

(Continued)

FOREIGN PATENT DOCUMENTS

| | | |
|---|---|---|
| JP | H04-114221 A | 4/1992 |
| KR | 10-1768449 B1 | 8/2017 |
| WO | WO 2018/039646 A1 | 3/2018 |

OTHER PUBLICATIONS

Mendes et al., System for sharing and monitoring vehicles. Co-pending U.S. Appl. No. 17/117,201, filed Dec. 10, 2020.

(Continued)

*Primary Examiner* — Thomas D Alunkal
(74) *Attorney, Agent, or Firm* — Wolf, Greenfield & Sacks, P.C.

(57) ABSTRACT

System, apparatus, device and methods relating to a telematic vehicle sharing platform ecosystem and a telematic vehicle share I/O expander to automate sharing and management of a vehicle that is shared by more than one operator.

20 Claims, 32 Drawing Sheets

(56) References Cited

U.S. PATENT DOCUMENTS

| | | | |
|---|---|---|---|
| 2015/0370253 A1 | 12/2015 | Gurin | |
| 2016/0019738 A1 | 1/2016 | Kim | |
| 2016/0195404 A1* | 7/2016 | Prasad | G06T 11/206 345/440 |
| 2017/0053470 A1 | 2/2017 | Bergerhoff et al. | |
| 2017/0105101 A1* | 4/2017 | Santavicca | H04W 4/023 |
| 2017/0228945 A1 | 8/2017 | Lee et al. | |
| 2017/0230790 A1 | 8/2017 | Skorma et al. | |
| 2018/0091930 A1 | 3/2018 | Jefferies et al. | |
| 2018/0189566 A1* | 7/2018 | Grimm | G06K 9/6257 |
| 2018/0204399 A1* | 7/2018 | Newman | H04W 12/08 |
| 2019/0061691 A1* | 2/2019 | Farges | G07C 9/22 |
| 2019/0193681 A1 | 6/2019 | Ito et al. | |
| 2019/0279440 A1 | 9/2019 | Ricci | |
| 2020/0103905 A1* | 4/2020 | Gurin | G05D 1/0088 |
| 2020/0151475 A1 | 5/2020 | Wunsche, III et al. | |
| 2020/0151625 A1 | 5/2020 | Wunsche, III et al. | |
| 2020/0173808 A1 | 6/2020 | Beaurepaire et al. | |
| 2020/0322337 A1 | 10/2020 | Han | |
| 2021/0009081 A1* | 1/2021 | Wang | G06K 9/0012 |
| 2021/0089988 A1 | 3/2021 | Tierney et al. | |

OTHER PUBLICATIONS

Mendes et al., Device for sharing and monitoring vehicles. Co-pending U.S. Appl. No. 17/117,207, filed Dec. 10, 2020.
Mendes et al., Method for sharing and monitoring vehicles. Co-pending U.S. Appl. No. 17/117,216, filed Dec. 10, 2020.
Mendes et al., System for shared vehicle utilization management. Co-pending U.S. Appl. No. 17/117,226, filed Dec. 10, 2020.
Mendes et al., Device for shared vehicle utilization management. Co-pending U.S. Appl. No. 17/117,239, filed Dec. 10, 2020.
Mendes et al., System for shared vehicle maintenance and recovery. Co-pending U.S. Appl. No. 17/117,378, filed Dec. 10, 2020.
Mendes et al., Device for shared vehicle maintenance and recovery. Co-pending U.S. Appl. No. 17/117,394, filed Dec. 10, 2020.
Mendes et al., Method for shared vehicle maintenance and recovery. Co-pending U.S. Appl. No. 17/117,404, filed Dec. 10, 2020.
Mendes et al., Shared vehicle communication management. Co-pending U.S. Appl. No. 17/117,431, filed Dec. 10, 2020.
Mendes et al., System for shared vehicle misuse management. Co-pending U.S. Appl. No. 17/117,548, filed Dec. 10, 2020.
Mendes et al., Device for shared vehicle misuse management. Co-pending U.S. Appl. No. 17/117,564, filed Dec. 10, 2020.
Mendes et al., Method for shared vehicle misuse management. Co-pending U.S. Appl. No. 17/117,589, filed Dec. 10, 2020.
Mendes et al., System for shared vehicle storage management. Co-pending U.S. Appl. No. 17/117,607, filed Dec. 10, 2020.
Mendes et al., Device for shared vehicle storage management. Co-pending U.S. Appl. No. 17/117,629, filed Dec. 10, 2020.
Mendes et al., Method for shared vehicle storage management. Co-pending U.S. Appl. No. 17/117,739, filed Dec. 10, 2020.
Mendes et al., Shared vehicle I/O expander. Co-pending U.S. Appl. No. 17/117,776, filed Dec. 10, 2020.
Mendes et al., Shared vehicle I/O expander method. Co-pending U.S. Appl. No. 17/117,803, filed Dec. 10, 2020.
Mendes et al., Method for shared vehicle storage management. Co-pending U.S. Appl. No. 17/176,471, filed Feb. 16, 2021.
Partial European Search Report for European Application No. 20215034.8, dated Mar. 1, 2021.
Partial European Search Report for European Application No. 21150061.6, dated Mar. 2, 2021.
Extended European Search Report for European Application No. 20215034.8, dated May 6, 2021.
Extended European Search Report for European Application No. 21150061.6, dated May 7, 2021.
[No Author Listed], Look at the Geotab GO device: Past, present and future. https://www.geotab.com/uk/blog/go-device-past-present-future/. Sep. 16, 2019:16 pages
Basra, Find success with IoT fleet management. Geotab. https://www.geotab.com/blog/iot-fleet-management/. May 2, 2019:3 pages.
Hall, Telematics RFP checklist for EV support: What fleets should expect from their telematics provider. Geotab. https://www.geotab.com/blog/rfp-checklist/. Mar. 26, 2020:5 pages.
Khan, Guide to Geotab IOX Add-Ons. Geotab. https://www.geotab.com/blog/iox-expansion/. Feb. 6, 2018:9 pages.
Stevens, Harnessing the power of IOX expansion. GoFleet. https://www.gofleet.com/harnessing-power-iox-expansion. Dec. 2, 2015:1-5.

* cited by examiner

Vehicle Sharing & Monitoring

Vehicle Share Communication Management

Vehicle Share Misuse Management

Vehicle Share Vehicle Selection Management

METHOD FOR SHARED VEHICLE UTILIZATION MANAGEMENT

CROSS-REFERENCE

This patent application claims the benefit under 35 U.S.C § 119(e) to U.S. Provisional Patent Application Ser. No. 63/012,536, titled "Telematic Vehicle Sharing Platform Ecosystem", filed on 20 Apr. 2020, which is herein incorporated by reference in its entirety.

TECHNICAL FIELD

The present disclosure generally relates to systems, devices and methods for vehicle sharing in a telemetry vehicle sharing platform ecosystem. More specifically, the present disclosure relates to a telematic device that enables drivers to share vehicles by utilizing a unique personal attribute in the form of an electronic device or other data driven features to access a vehicle. Once inside a vehicle the driver has predefined control of vehicle systems to start, operate, drive and stop the vehicle. The predefined control may be limited or unlimited based upon the type of vehicle share reservation. The present disclosure also relates to automated complex vehicle share management. Complex vehicle share management includes sharing and monitoring a vehicle, shared vehicle utilization management, shared vehicle maintenance and recovery, shared vehicle communication management, identifying and reporting vehicle share misuse and complex vehicle share storage management.

BACKGROUND

Virtual vehicle key sharing is known but the technology has a number of deficiencies. One past approach provides a readily available key located within a vehicle wherein anyone entering the vehicle may start and operate the vehicle. This past approach leaves a vehicle prone to theft. Other past approaches fail to take advantage of telematic technologies, data and the benefits of an integrated telematic vehicle sharing platform ecosystem.

One past application of vehicle sharing is U.S. Pat. No. 9,947,153 (Ser. No. 15/452,314) issued to Bergerhoff et al on Apr. 17, 2018 for a Secure Smartphone Based Access and Start Authorization System for Vehicles. A Bluetooth enabled smartphone may be used for both access control and start authorization in a secure and safe way, and embodiments are backward-compatible with conventional vehicle access and start systems. A smart phone acts as an intermediary authorization device to a code generator which effectively resembles a car key that is installed in a vehicle. A Bluetooth transceiver and the code generator and, optionally, for the retrofit solution, an RF/LF transceiver are added to the vehicle. The Bluetooth transceiver communicates with the smart phone. The code generator communicates with electronic control units in the vehicle that control access, immobilization and engine start. The communication may happen via a wired connection or, in the case of the retrofit solution, via an RF/LF transceiver that mimics an additional car key programmed to the vehicle.

Another past application of vehicle sharing is United States Patent Application 2018/0297558 (Ser. No. 15/950,672) published to Froitzheim on Oct. 18, 2018 for a Motor Vehicle Access And/Or Start System. The present disclosure relates to motor vehicles. Various embodiments may include methods and apparatuses for unlocking a motor vehicle using a motor vehicle access and/or start system. For example, a vehicle key for opening, starting, and locking a motor vehicle may include: a first transceiver communicating with the motor vehicle access and start system; a second transceiver communicating with a mobile radio terminal; and a controller which, on the basis of a code received from the mobile radio terminal and in the form of either a release code or a locking code, either releases or locks communication between the vehicle key and the motor vehicle access and start system. The communication is associated with unlocking, starting and/or locking the motor vehicle.

Another past application of vehicle sharing is United States Patent Application 2019/0039567 (Ser. No. 16/074,517) published to Froitzheim et. Al. on Feb. 7, 2019 for Methods and Apparatuses For Unlocking A Motor Vehicle Having An Engine Start And/Or Vehicle Entry System. Various embodiments may include systems for unlocking a motor vehicle. For example, an apparatus may include: a motor vehicle key for unlocking a motor vehicle having a remote engine start and/or vehicle entry system. The motor vehicle key comprises a Bluetooth antenna and a motor vehicle communicating antenna. A controller of the motor vehicle key is configured to: use the Bluetooth antenna to set up a Bluetooth link to a mobile radio terminal using an activation key stored in a memory of the motor vehicle key; and instruct a motor vehicle controller installed in the motor vehicle to prompt an operation of the motor vehicle.

SUMMARY

The present disclosure is directed to aspects of telematic vehicle sharing platform ecosystem. Aspects and embodiments include a telematic device, a vehicle share reservation platform, a vehicle share management platform, a vehicle share data analytics platform and aspects of systems, devices and methods for the ecosystem. More specifically, there is a telematic vehicle share I/O expander, a method for a telematic vehicle share I/O expander, a system for sharing and monitoring shared use of a vehicle, a device for sharing and monitoring shared use of a vehicle, a method for sharing and monitoring share use of a vehicle, a system for shared vehicle utilization management, a device for share vehicle utilization management, a method for shared vehicle utilization management, a system for vehicle share maintenance management, a device for vehicle share maintenance management, a method for vehicle share maintenance management, vehicle share communication, a system to identify shared vehicle misuse, a device to identify shared vehicle misuse, a method to identify shared vehicle misuse, a system for vehicle share storage management, a device for vehicle share storage management and a method for vehicle share storage management.

According to a broad aspect, there is a telematic vehicle share I/O expander. The expander comprises: a microprocessor, memory and firmware, communications circuitry, at least one internal interface and at least one external interface. The microprocessor, memory and firmware for controlling the expander. The microprocessor, memory and firmware for controlling data through the plurality of internal interfaces and plurality of external interfaces. The at least one internal interface to obtain at least one unique personal attribute. The at least one external interface to couple with a vehicle interface for communicating with a vehicle bus. Wherein the expander upon receiving a valid at least one unique personal attribute enabling a defined set of controls to activate vehicle features through the at least one external interface for operation of the vehicle.

According to another broad aspect, there is a method for a telematic vehicle share I/O expander. The method comprising: receiving reservation data, the reservation data for validating at least one unique personal attribute, the reservation data and the at least one unique personal attribute enabling a defined set of vehicle control; sensing at least one unique personal attribute in proximity so to a vehicle, comparing the at least one unique personal attribute and the reservation data thereby upon validating the at least one unique personal attribute enabling a defined set of vehicle controls.

According to another broad aspect, there is a system for sharing and monitoring shared use of a vehicle. The system comprises: at least one telematic device, at least one unique personal attribute, at least one computing device, and at least one server. The at least one telematic device is associated with a vehicle and capable to communicate with a vehicle and a communication network. The at least one telematic device monitoring the vehicle to log and communicate shared vehicle data. The at least one unique personal attribute capable to be associated with the at least one telematic device. The at least one server capable to communicate with at least one telematic device. The at least one server receiving a reservation request for reserving a vehicle. The at least one server validating the reservation request and providing a validated reservation request indicative of the unique personal attribute to the at least one telematic device thereby providing a secured personal reservation with the vehicle for sharing and monitoring use of the shared vehicle.

According to another broad aspect, there is a device for sharing and monitoring shared use of a vehicle. The device comprises at least one telematic device and at least one unique personal attribute. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device receiving from at least one server a validated reservation request indicative of the unique personal attribute thereby providing a secured personal reservation with the vehicle for sharing and monitoring use of the vehicle.

According to another broad aspect, there is a method for sharing and monitoring shared use of a vehicle. The method comprises: receiving at a server a reservation request, validating the reservation request, validating the reservation request including a unique personal attribute and a reservation authentication, sending a validated reservation request indicative of the unique personal attribute to at least one telematic device associated with the vehicle, the validated reservation request enabling concurrent use of the vehicle and concurrent monitoring of shared vehicle data associated with the unique personal attribute to provide shared vehicle management.

According to another broad aspect, there is a system for shared vehicle utilization management. The system comprises: at least one telematic device, at least one unique personal attribute and a vehicle share platform. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to the vehicle share platform. From the beginning of an active vehicle share reservation to the completion of the vehicle share reservation, the telematic device communicating the shared vehicle data to the vehicle share platform. For each of the at least one unique personal attribute, the vehicle share platform processing the shared vehicle data and reservation data for providing shared vehicle management for a shared vehicle thereby determining a match for an available vehicle and a vehicle share reservation associated to the at least one unique personal attribute.

According to another broad aspect, there is a device for shared vehicle utilization management. The device comprises at least one telematic device and at least one unique personal attribute. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to the vehicle share platform. From the beginning of an active vehicle share reservation to the completion of the vehicle share reservation, the telematic device communicating the shared vehicle data to the vehicle share platform. For each of the at least one unique personal attribute, the vehicle share platform processing the shared vehicle data and reservation data for providing shared vehicle management for a shared vehicle thereby determining a match for an available vehicle and a vehicle share reservation associated to the at least one unique personal attribute.

According to another broad aspect, there is a method for shared vehicle utilization management. The method comprises: receiving in a telematic device from a vehicle share platform a vehicle share reservation, subsequent to the receiving a vehicle share reservation, receiving an indication of a unique personal attribute capable to be associated with a telematic device and the vehicle, initiating an active vehicle reservation, from the beginning of the active vehicle reservation to the completion of the vehicle share reservation, monitoring the shared vehicle and communicating shared vehicle data to the vehicle share platform, processing on the vehicle share platform the shared vehicle data with reservation data for providing shared vehicle management for a future shared vehicle thereby determining a match for an available vehicle for the future shared vehicle associated to at least one unique personal attribute.

According to another broad aspect, there is a system for shared vehicle maintenance management. The system comprises at least one telematic device, at least one unique personal attribute and a vehicle management platform. The at least one telematic device associated with a vehicle and capable to communicate with the vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to the vehicle management platform. From the beginning of an active vehicle share reservation to the completion of the vehicle share reservation, the telematic device communicating the shared vehicle data to the vehicle management platform. For each of the at least one unique personal attribute, the vehicle management platform for processing the shared vehicle data and reservation data providing shared vehicle maintenance identification for the shared vehicle thereby determining the maintenance requirements between reservations of the shared vehicle.

In another broad aspect, there is a device for shared vehicle maintenance management. The device comprises at least one telematic device and at least one unique personal attribute. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to a vehicle management platform. From the beginning of an active vehicle share reservation to the completion of the vehicle share reservation. The telematic device communicating the shared vehicle data to the vehicle management platform. For each of the at least one unique personal attribute, the vehicle management platform processing the shared vehicle data and reservation data providing shared vehicle maintenance identification for the shared vehicle thereby determining the maintenance requirements between reservation of the shared vehicle.

In another broad aspect, there is a method for shared vehicle maintenance management. The method comprising: receiving in a telematic device from a vehicle share platform a vehicle share reservation, subsequent to the receiving a vehicle share reservation, receiving an indication of a unique personal attribute capable to be associated with a telematic device and the shared vehicle, initiating an active vehicle reservation, from the beginning of the active vehicle reservation to the completion of the vehicle share reservation, monitoring the shared vehicle and communicating shared vehicle data to a vehicle maintenance platform, processing the shared vehicle data and reservation data providing shared vehicle maintenance identification for the shared vehicle thereby determining the maintenance requirements between reservations of the shared vehicle.

In another broad aspect, there is a system for vehicle share communication with impeded access to a communication network. The system comprises: a plurality of telematic devices associated with vehicles, a vehicle share platform, a plurality of communication devices, and at least one unique personal attribute. The vehicle share management platform capable to communicate with a communication network. At least one of the plurality of telematic devices or at least one of the plurality of communication devices capable to communicate with a communication network. Wherein one of the plurality of telematic devices communicates to identify one of the at least one unique personal attribute, the one of the plurality of telematic devices communicates in sequence to the plurality of telematic devices until a connection to the communication network is established permitting connection to the vehicle share platform for access to a shared vehicle.

In another broad aspect, there is a system for identifying vehicle share misuse. The system comprises: at least one telematic device, at least one unique personal attribute and a vehicle share platform. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to the vehicle share platform. The at least one telematic device receiving reservation data, the reservation data including vehicle share limits. The at least one telematic device identifying the at least one unique personal attribute associated with the reservation data and the vehicle share limits. Thereby processing the shared vehicle data with the vehicle share limits and communicating a misuse event to the vehicle share platform upon a detected misuse of the shared vehicle.

In another broad aspect, there is a device for identifying vehicle share misuse. The device comprises at least one telematic device and at least one unique personal attribute. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to a vehicle share platform. The at least one telematic device receiving reservation data from the vehicle share platform, the reservation data including vehicle share limits. The at least one telematic device identifying the at least one unique personal attribute associated with the reservation data and the vehicle share limits. Thereby, processing the shared vehicle data with the vehicle share limits and communicating a misuse event to the vehicle share platform upon a detected misuse of the shared vehicle.

In another broad aspect, there is a method for identifying vehicle share misuse. The method comprises: receiving reservation data including vehicle share limits in a telematic device, monitoring a vehicle by said telematic device to log shared vehicle data, communicating the vehicle data to the vehicle share platform, identifying at least one unique personal attribute associated with the reservation data and the vehicle share limits, communicating a misuse event to the vehicle share platform upon a detected misuse of the shared vehicle.

In another broad aspect, there is a system for vehicle share storage management. The system comprises: at least one telematic device, at least one unique personal attribute and a vehicle share platform. The at least one telematic device associated with a vehicle and capable to communicate with a vehicle and other devices over a communication network. The at least one telematic device monitoring the vehicle to log and communicate shared vehicle data. The at least one unique personal attribute capable to be associated with the at least one telematic device. The at least one telematic device capable to communicate the shared vehicle data to the vehicle share platform. The vehicle shared platform having access to historical vehicle data. The vehicle share platform having access to historical vehicle share customer data. Wherein the vehicle share platform processes the historical vehicle data and the historical vehicle share customer data to identify an optimal location to store the vehicle based upon customer requirements.

In another broad aspect, there is a device for vehicle share storage management. The device comprises at least one telematic device and at least one unique personal attribute. The at least one telematic device associated with a vehicle and capable to communicate with a vehicle and other devices over a communication network. The at least one telematic device monitoring the vehicle to log and communicate shared vehicle data. The one unique personal attribute capable to be associated with the at least one telematic device. The at least one telematic device capable to communicate the shared vehicle data to a vehicle share platform. The vehicle share platform having access to historical vehicle data. The vehicle share platform having access to historical vehicle share customer data. Wherein the vehicle share platform processes the historical vehicle data and the historical vehicle share customer data to identify an optimal location to store the vehicle based upon customer requirements.

In another broad aspect, there is a method for vehicle share storage management. The method comprises: receiving historical vehicle data, the historical vehicle data indicative of vehicle share use, receiving historical vehicle share customer data, processing the historical vehicle data and the historical vehicle share customer data to identify an optimal location to store the vehicle based upon customer requirements.

In embodiments, the at least one telematic device includes a sensor for identifying the at least one unique personal attribute with the secured personal reservation to validate a reservation.

In embodiments, the sensor is a biometric sensor for sensing biometric features relating to the at least one unique personal attribute to validate a reservation. In embodiments, the biometric features and the at least one unique personal attribute are selected from the group consisting of a face, a fingerprint, an eye or voice.

In embodiments, the sensor is a proximity sensor for sensing a proximal device relating to the at least one unique personal attribute to validate a reservation. In embodiments, the proximal device is an RFID tag relating to the at least one unique personal attribute. In embodiments the proximal device is a proximity card relating to the at least one unique personal attribute.

In embodiments, the sensor includes wireless communication for sensing a personal device relating to the at least one unique personal attribute to validate a reservation. In embodiments, the personal device is selected from the group consisting of a smart phone, a smart watch, a smart fob, or a vehicle share app installed on a smart device.

In embodiments, the telematic device includes at least one vehicle interface for monitoring the vehicle. In embodiments, the at least one vehicle interface is selected from the group of an OBDII connection, an indirect connection to a vehicle bus or a physical connection to a vehicle bus.

In embodiments, the telematic device includes a vehicle portion and a vehicle share portion. In embodiments, the vehicle portion includes a microprocessor, memory and firmware for monitoring, logging and communicating the shared vehicle data.

In embodiments, the shared vehicle data is selected from the group of speed data, location data, accelerometer data and engine data. In embodiments, the shared vehicle data provides indications of vehicle use and the indications of vehicle use are associated with at least one unique personal attribute. In embodiments, the vehicle data is selected from the group of fluid level data, energy level data or location data. In embodiments, vehicle use indicates maintenance and the shared vehicle data is selected from the group of energy level data, oil level data, coolant level data, washer fluid level data or location data. In embodiments, vehicle use indicates recovery and the shared vehicle data is selected from the group of accelerometer data, fluid level data, energy level data or location data. In embodiments, vehicle use indicates misuse and the shared vehicle data is selected from the group of accelerometer data or location data. In embodiments, the shared vehicle data further includes speed data and indications of harsh events from accelerometer data.

In embodiments, the vehicle share portion includes a microprocessor, memory and firmware for permitting operation of the vehicle based upon the secured personal reservation. In embodiments, operation of the vehicle is restricted to unlocking and locking the vehicle in a maintenance mode. In embodiments, operation of the vehicle is restricted to a geofence area of operation of the vehicle within a defined space or range. In embodiments, operation of the vehicle is restricted to a date and time of us.

In embodiments, the validated reservation request includes vehicle sharing permissions. In embodiments, the vehicle sharing permissions pertain to a date and time. In embodiments, the vehicle sharing permissions are activities selected from the group of early check in, normal check in, late check in, or late check out.

In embodiments, the vehicle sharing permissions include select vehicle commands for operating the vehicle. In embodiments, the vehicle commands are selected from the group of unlock doors, lock doors, vehicle start, prevent vehicle start, a geofence limitation or a route limitation. In embodiments, the vehicle commands are a group of commands associated with a maintenance activity. In embodiments, the vehicle commands are a group of commands associated with a recovery activity. In embodiments the vehicle commands are a group of commands associated with a cleaning activity. In embodiments, the vehicle commands are a group of commands for limited use of the vehicle. In embodiments, the vehicle commands are a group of commands for unlimited use of the vehicle.

In embodiments, the at least one telematic device includes a sensor for identifying the at least one unique personal attribute to associate the at least one unique personal attribute with the shared vehicle data. In embodiments, the sensor is a proximity sensor for sensing a proximal device relating to the at least one personal attribute.

In embodiments, the reservation data includes at least one of a purpose of vehicle use, preferred start location, preferred stop location, vehicle type, length of use, distance required, energy required or parked location.

In embodiments, the shared vehicle data includes at least one of energy at start of an active reservation, energy replenishment, energy at completion of a reservation, actual start location, actual stop location or fluid levels.

In embodiments, the reservation data includes at least one of a purpose of vehicle use, preferred start location, preferred stop location, vehicle type, length of use, distance required, energy required or parked location and the shared vehicle data includes at least one of energy at start of an active reservation energy replenishment, energy at completion of a reservation, actual start location, actual stop location or fluid levels.

In embodiments, the preferred start location and the actual location are processed by the vehicle share platform to determine the match and the match is a best match based upon location data. In embodiments, the distance required and the energy at completion of a reservation are processed by the vehicle share platform to determine the match and the match is a best match based upon energy data. In embodiments, the preferred start location and the actual location are processed by the vehicle share platform with a threshold to determine the match and the match is an acceptable match based upon the threshold. In embodiments, the vehicle share platform provides a vehicle share incentive with the acceptable match. In embodiments, the distance required, and the energy state completion of a reservation are processed by the vehicle share platform to determine the match and the match is an acceptable matched based upon energy data. In embodiments, the vehicle share platform provides a vehicle share incentive with the acceptable match. In embodiments, the vehicle share platform processing the shared vehicle data and reservation data for providing shared vehicle management for a shared vehicle thereby determining a best match for an available vehicle and a vehicle share reservation associated to at least one unique personal attribute.

In embodiments, the indication is a biometric indication. In embodiments, the biometric indication is selected from the group consisting of a face, a fingerprint, an eye or voice relating to the unique personal attribute. In embodiments, the indication is a proximal indication. In embodiments, the proximal indication is one of a RFID tag or a proximity card relating to the unique personal attribute. In embodiments, the indication is a personal device indication. In embodiments, the personal device indication is selected from the group consisting of a smart phone, a smart watch, a smart fob or a vehicle share app installed on a smart device. In embodiments, the shared vehicle data provides indications of vehicle use and the indications of vehicle use are associated with the unique personal attribute.

In embodiments, receiving reservation data, the reservation data including at least one of a purpose of vehicle use, preferred start location, preferred stop location, vehicle type, length of use, distance required, energy required or parked location. In embodiments, receiving reservation data, the reservation data having at least one purpose of vehicle use, preferred start location, preferred stop location, vehicle type, length of use, distance required, energy required or parked location and the shared vehicle data having at least one of energy at start of the active reservation, energy replenishment, energy at completion of the active reservation, actual start location, actual stop location or fluid levels.

In embodiments, processing the preferred start location and the actual location to determine the match and the match is a best match based upon location data. In embodiments, processing the energy at completion of a reservation and the distance required to determine the match and the match is a best match based upon energy data. In embodiments, processing the start location and the actual location with a threshold to determine the match and the match is an acceptable match based upon the location data. In embodiments, processing the distance required and the energy at completion of a reservation to determine the match and the match is an acceptable match based upon energy data. In embodiments, providing a vehicle share incentive with an acceptable match.

In embodiments, the parked location and the energy at completion are processed to determine an energy maintenance event. In embodiments, the energy maintenance even includes recovery of the vehicle.

In embodiments, the parked location and the fluid levels are processed to determine a fluid level maintenance event.

In embodiments, the location and the accelerometer indications are processed to determine an accident maintenance event. In embodiments, the accident maintenance event includes recovery of the vehicle.

In embodiments, the location and engine data are processed to determine an engine maintenance event.

In embodiments, when the plurality of telematic devices fail to establish a connection to the communication network and further communicate in sequence to the plurality of communication devices until a connection to said communication network is established permitting the connection to the vehicle share platform for access to a shared vehicle.

In embodiments, the communication network is selected from the group consisting of satellite, WIFI, hotspot, Bluetooth or cellular communication. In embodiments, the communication network is a mix of communication networks. In embodiments, the mix of communication is a mix of satellite, WIFI, hotspot, Bluetooth or cellular communication.

In embodiments, the telematic devices are capable for communication with the shared vehicle and the shared vehicle is capable for communication with the communication network.

In embodiments, including a telematic vehicle share I/O expander, the telematic devices are capable for communication with the telematic vehicle share I/O expander. In embodiments, the telematic devices are capable for communication with the communication network. In embodiments, the telematic vehicle share I/O expander is capable for communication with the communication network. In embodiments, the telematic vehicle share I/O expander is capable to communicate with the communication devices.

In embodiments, a misuse event is selected from the group consisting of an invalid user, invalid reservation, movement event, location event, harsh event, speed event, geofence event or a biometric event.

In embodiments, a misuse event triggers communicating location data of the vehicle to the vehicle share platform to track the vehicle. In embodiments, the invalid user is detected by comparing the at least one unique personal attribute with the reservation data and the misuse event triggers communicating location data of the vehicle to the vehicle share platform to track the vehicle. In embodiments, the invalid reservation is detected by comparing the at least one unique personal attribute with the reservation data and the misuse event triggers communicating location data of the vehicle to the vehicle share platform to track the vehicle. In embodiments, the movement event is detected by comparing engine data obtained from the at least one telematic device with reservation data to determine movement and an invalid reservation and the misuse event triggers communicating location data of the vehicle to the vehicle share platform to track the vehicle. In embodiments, the location event is detected by comparing location data obtained from the at least one telematic device with the reservation data to determine an invalid location of the vehicle and the location event triggers communicating location data of the vehicle to the vehicle share platform to track the vehicle. In embodiments, the harsh event is detected by comparing accelerometer data with harsh event thresholds to determine a harsh event and trigger communicating a harsh event indication with the at least one unique personal attribute to the vehicle share platform. In embodiments, the speed event is detected by comparing engine data or GPS data with speed event thresholds to determine a speed event and trigger communicating a speed event indication with the at least one unique personal attribute to the vehicle share platform. In embodiments, the geofence event is detected by comparing GPS data of the vehicle with the reservation data to determine a geofence violation and the geofence event triggers communicating location data of the vehicle to the vehicle share platform to track the vehicle.

In embodiments, historical vehicle data is selected from the group of start location data, distance data, finish location data, energy consumed data, energy remaining data or route data.

In embodiments, historical vehicle share customer data is selected from the group of start location data, distance data, finish location data or energy required data.

In embodiments, optional location is a floating location based upon the historical vehicle data and the historical vehicle share customer data. In embodiments, optional location is a particular depot based upon the historical vehicle data and the historical vehicle share customer data. In embodiments, optimal location requires vehicle location based upon the historical vehicle data and the historical vehicle share customer data. In embodiments, the optimal location is based upon a day of the week. In embodiments, the optimal location is based upon particular days of the month.

In embodiments, the vehicle share platform communicates a vehicle relocation request. In embodiments, the relocation request is a floating location request for moving the vehicle to a floating location. In embodiments, the relocation request is a particular depot request for moving the vehicle to a particular depot location.

In embodiments, the telematic device communicating with the vehicle share I/O expander to send and receive commands and vehicle share data, the telematic device for monitoring, logging and communicating the vehicle share data to a remote device.

In embodiments, the at least one internal interface includes biometric circuitry and the at least one unique personal attribute is a biometric attribute. In embodiments, the biometric attribute is selected from the group of face data, fingerprint data, voice data or eye data.

In embodiments, the at least one internal interface includes communication circuitry and the at least one unique personal attribute is a personal device. In embodiments, the personal device is selected from the group of a smart phone, a smart watch, a smart device, or an app on a smart device.

In embodiments, the at least one internal interface includes proximity circuitry and the at least one unique personal attribute is a proximity device.

In embodiments, there is an area to restrict sensing and communication within the vehicle. In embodiments, the area to restrict sensing and communication houses an electronic vehicle key device. In embodiments, the electronic vehicle key device is coupled to the telematic vehicle share I/O expander for communication with vehicle.

In embodiments, the at least one internal interface is for connecting to a vehicle bus to send and receive vehicle commands.

In embodiments, the at least one internal interface is for connecting to a digital switch and the digital switch is for connecting to a vehicle bus to enable activation and deactivation of the vehicle. In embodiments, the digital switch is a relay.

In embodiments, the telematic vehicle share I/O expander includes a plurality of internal interfaces. In embodiments, the plurality of internal interfaces connect to circuitry selected from the group of digital switch circuitry, communications circuitry, vehicle bus or an electronic vehicle key device. In embodiments, the plurality of internal interfaces enable the defined set of controls to activate or deactivate vehicle features. In embodiments, the plurality of internal interfaces connect to circuitry selected from the group of biometric circuitry, proximity circuitry, communications circuitry. In embodiments, the plurality of internal interfaces enable recognition of a valid at least one unique personal attribute.

In embodiments, telematic vehicle share I/O expander receives reservation data and the reservation data enables validation of the unique personal attribute. In embodiments, the reservation data enables the defined set of controls to activate or deactivate vehicle features.

In embodiments, defined set of controls are limited sets of controls. In embodiments, defined set of controls are an unlimited set of controls. In embodiments, defined sets of controls are limited and selected from the group of open, unlock, lock, start, stop or geofence.

In embodiments, the telematic device receives reservation data and the reservation data enables validation of the unique personal attribute. In embodiments, the reservation data enables the defined set of controls to activate or deactivate vehicle features.

In embodiments, monitoring the vehicle to log and communicate vehicle share data to a remote device.

In embodiments, upon validating the one unique personal attribute, communicating the defined set of vehicle controls to a vehicle bus. In embodiments, upon validating the one unique personal attribute, monitoring the vehicle for vehicle data. In embodiments, sensing the at least one unique personal attribute is sensing a biometric attribute. In embodiments, the biometric attribute is selected from the group of face data, fingerprint data, voice data or eye data. In embodiments, sensing the at least one unique personal attribute is sensing a personal device attribute. In embodiments, the personal device attribute is selected from the group of a smart phone, a smart watch, a smart device, or an app on a smart device. In embodiments, sensing the at least one unique personal attribute is sensing a proximity device.

In embodiments, restricting sensing and communication of an electronic vehicle key device and emulating electronic vehicle key signals.

In embodiments, connecting to a vehicle bus to send and receive the defined set of vehicle controls. In embodiments, enabling a number of interfaces for communicating the defined set of controls to activate or deactivate vehicle features. In embodiments, the defined set of vehicle controls is a limited set of controls based upon the reservation data. In embodiments, the defined set of vehicle controls is an unlimited set of controls based upon the reservation data.

In embodiments, enabling a digital switch to enable activation and deactivation of the vehicle.

These and other aspects and features of non-limiting embodiments are apparent to those skilled in the art upon review of the following detailed description of the non-limiting embodiments and the accompanying drawings. Further, it should be appreciated that the foregoing concepts, and additional concepts described below, may be arranged in any suitable combination, as the present disclosure is not limited in this respect.

BRIEF DESCRIPTION OF THE DRAWINGS

Exemplary non-limiting embodiments are described with reference to the accompanying drawings in which.

The drawings are not necessarily to scale and are diagrammatic representations of the exemplary non-limiting embodiments of the present invention.

DETAILED DESCRIPTION

Telematic Vehicle Sharing Platform Ecosystem

Figure 1A:
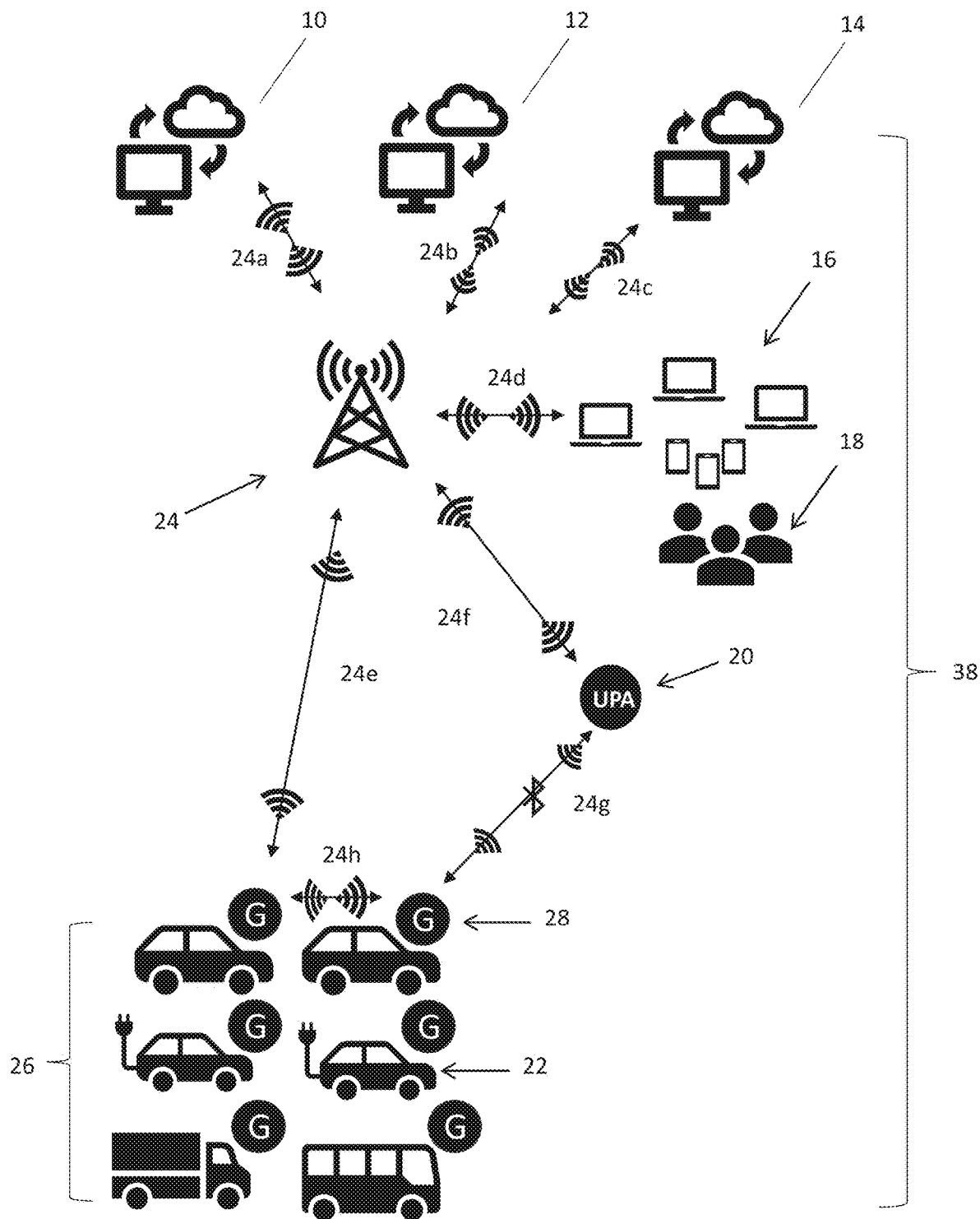
FIG. 1a is a high-level diagrammatic view of a telematic vehicle sharing ecosystem.
Figure 1B:
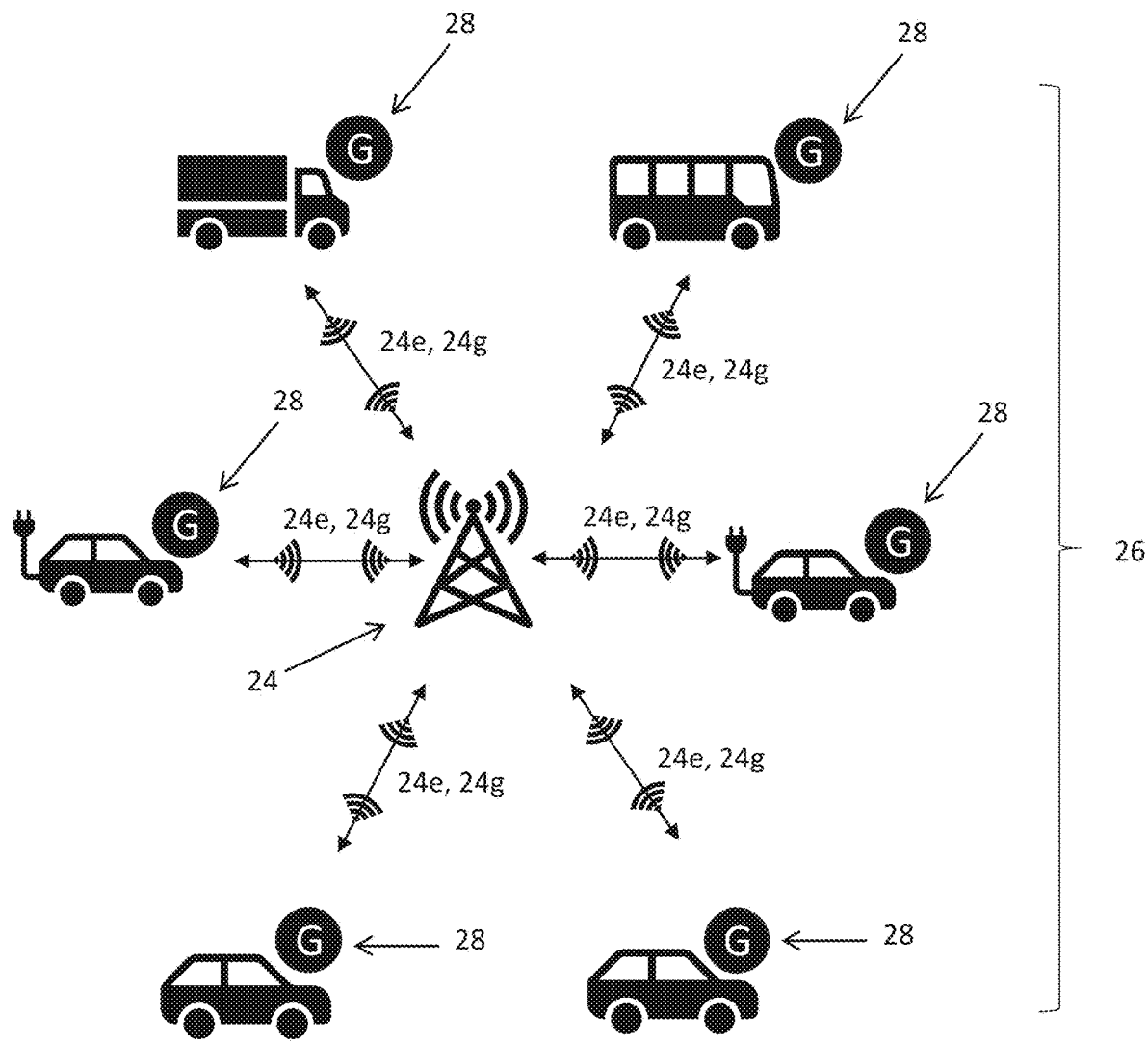
FIG. 1b is a high-level diagrammatic view of inter-vehicle communication within the telematic vehicle sharing ecosystem.
Figure 1C:
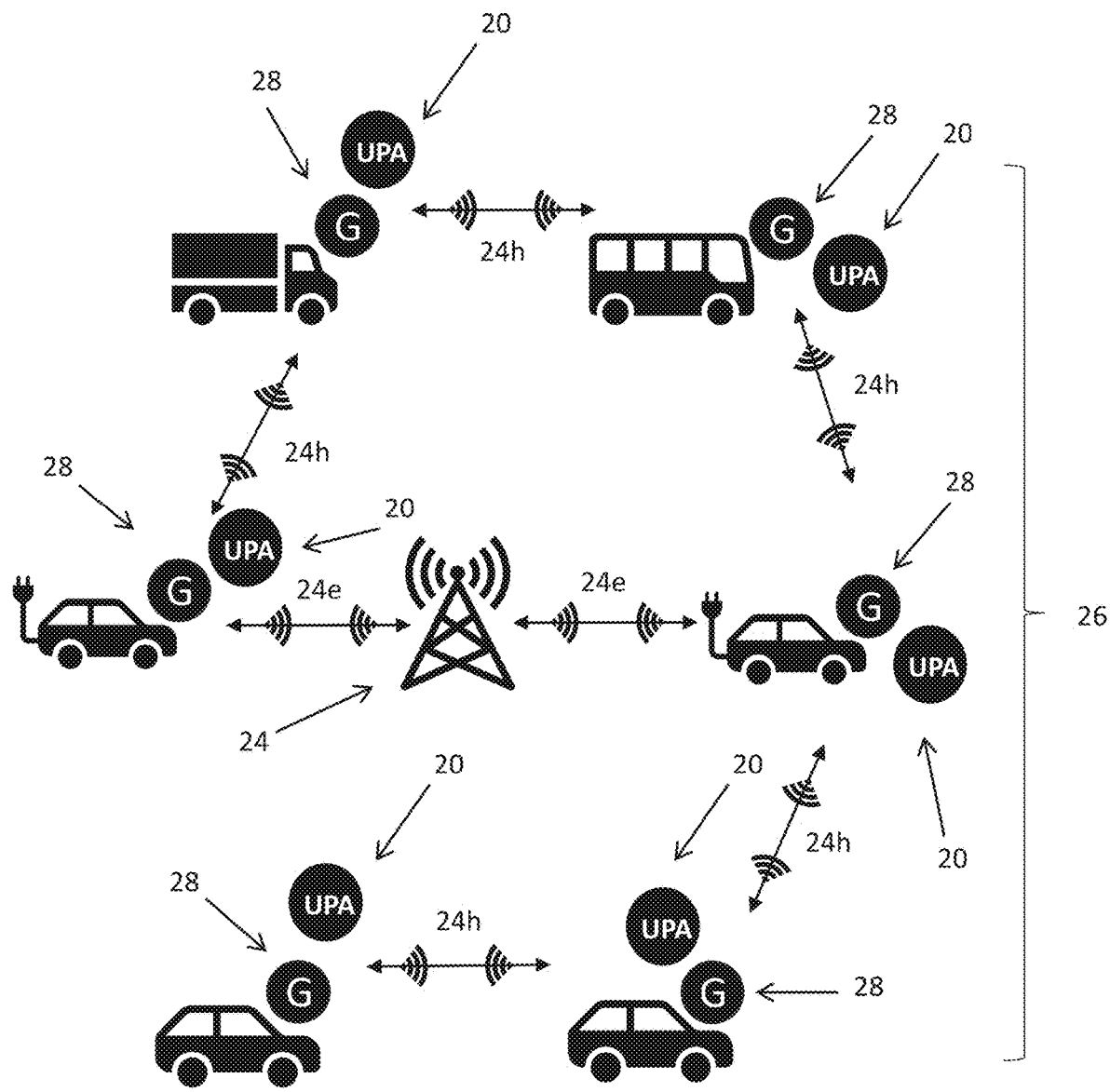
FIG. 1c is a high-level diagrammatic view of inter-device communication within the telematic vehicle sharing ecosystem.
Figure 2A:
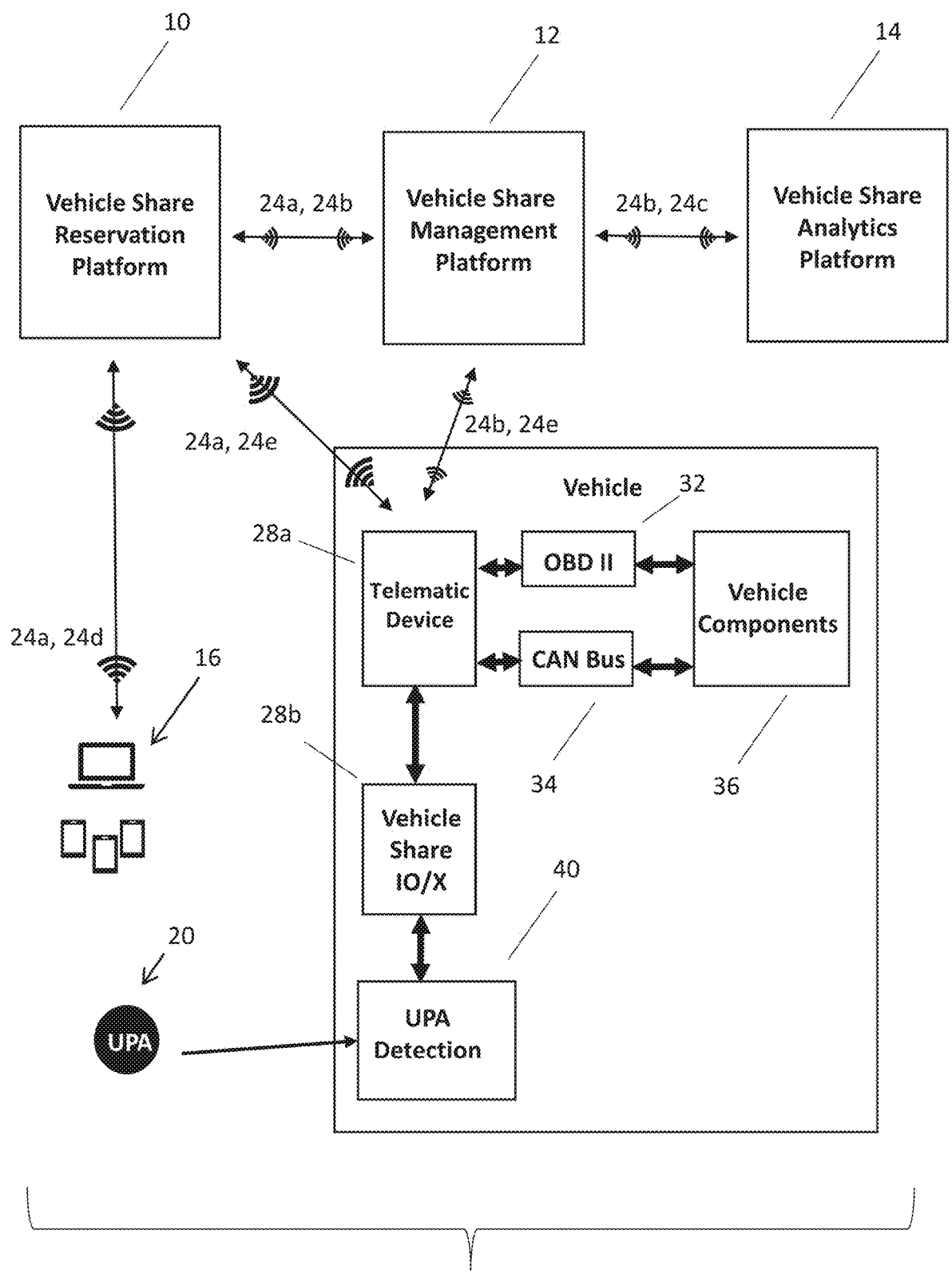
FIG. 2a is a high-level diagrammatic view of a telematic vehicle sharing platform with a vehicle and associated hardware components including a unique personal attribute detection.
Figure 2B:
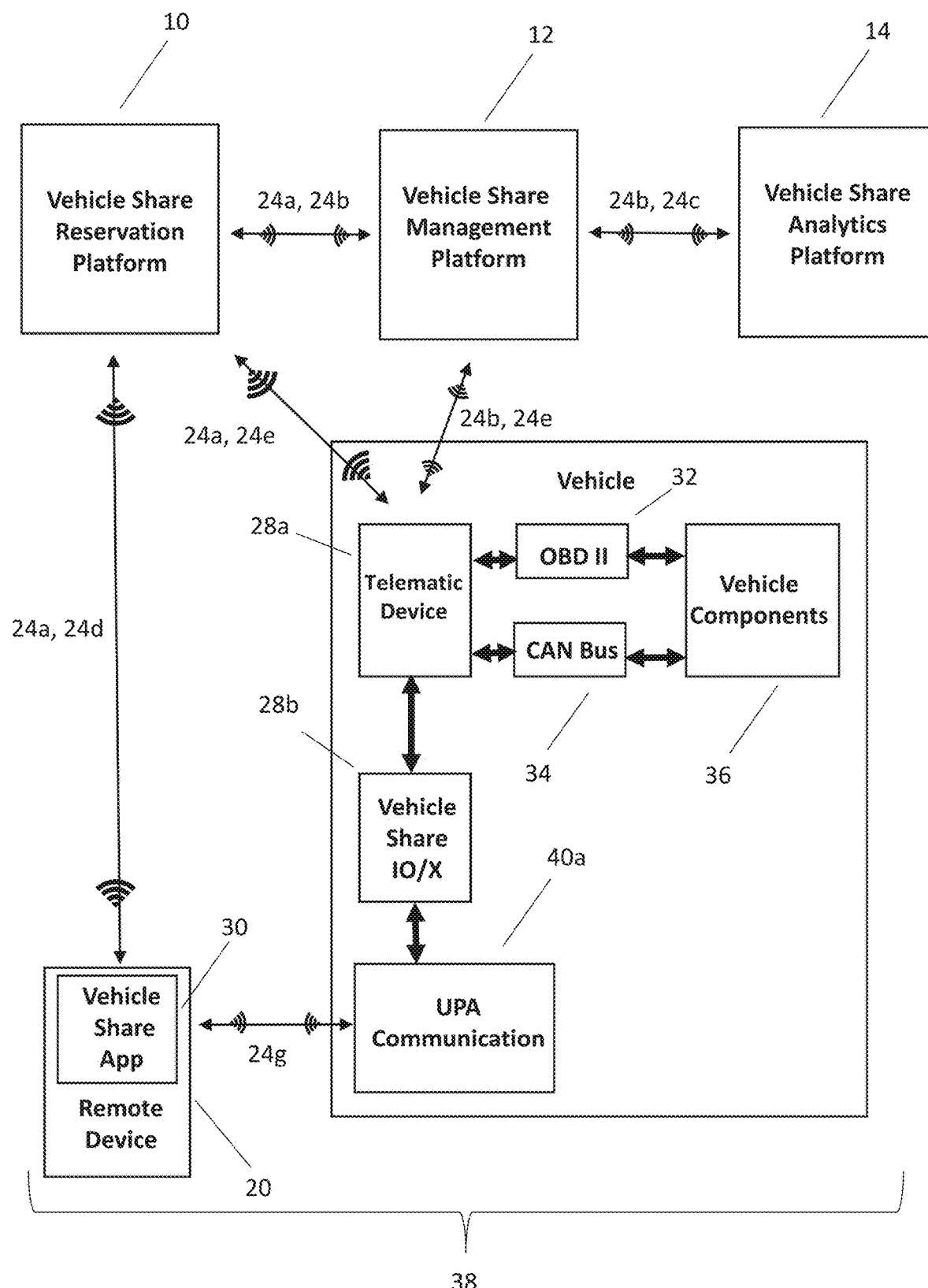
FIG. 2b is a high-level diagrammatic view of a telematic vehicle sharing platform with a vehicle and associated hardware components including a smart device embodiment of the unique personal attribute communication.
Figure 2C:
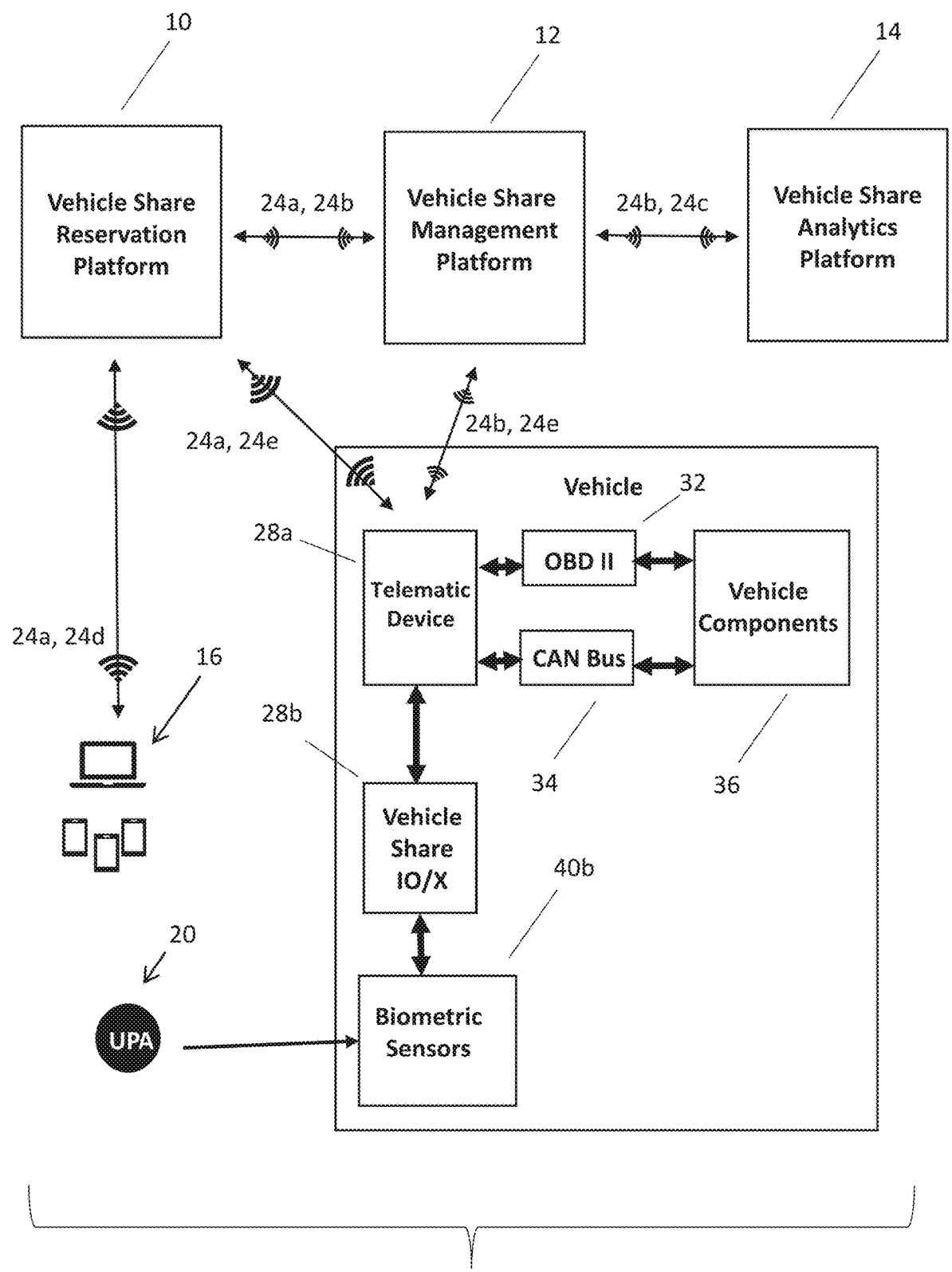
FIG. 2c is a high-level diagrammatic view of a telematic vehicle sharing platform with a vehicle and associated hardware components including a biometric sensing embodiment of the unique personal attribute.
Figure 2D:
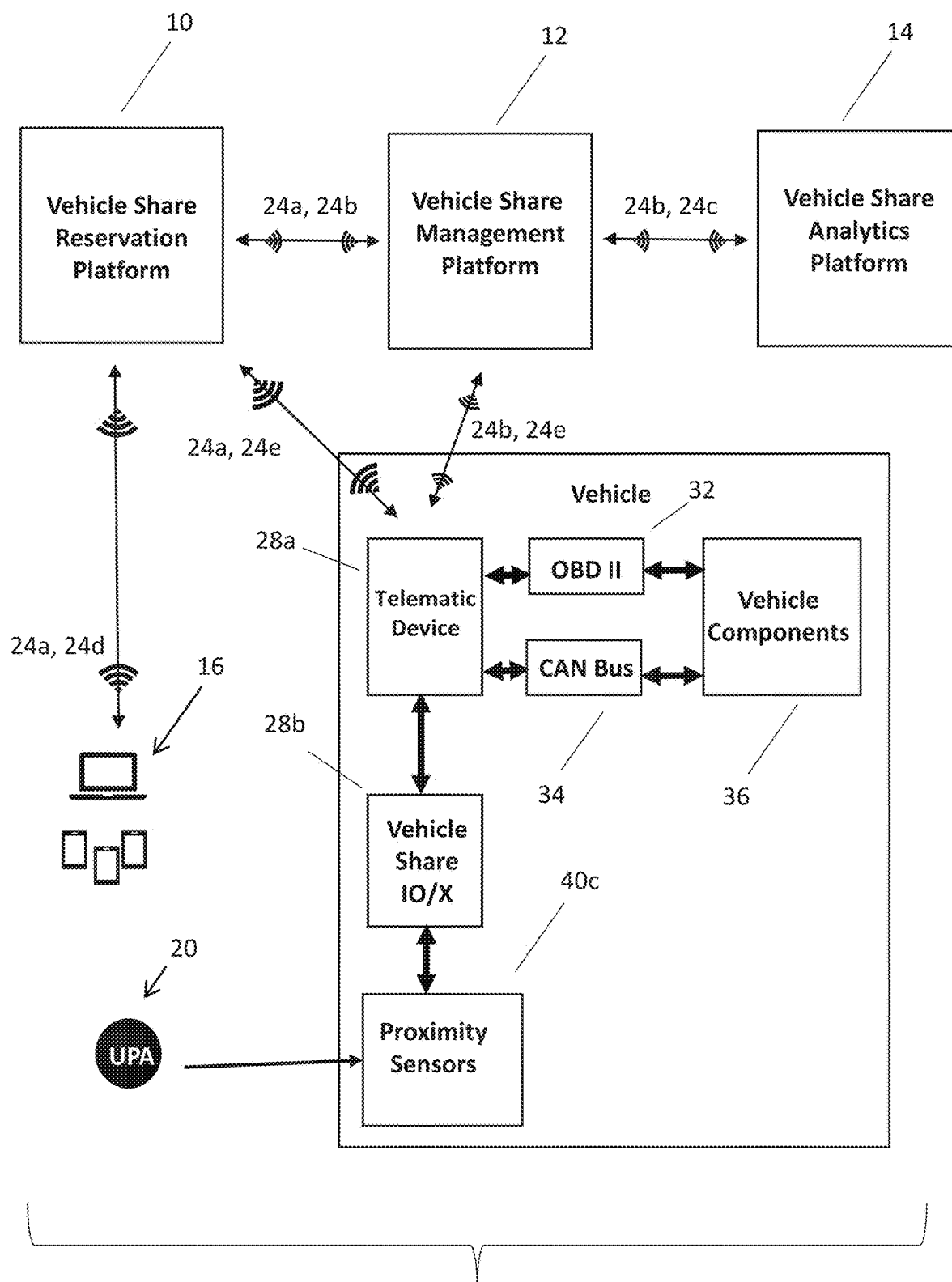
FIG. 2d is a high-level diagrammatic view of a telematic vehicle sharing platform with a vehicle and associated hardware components including a proximity sensing embodiment of the unique personal attribute.
Figure 2E:
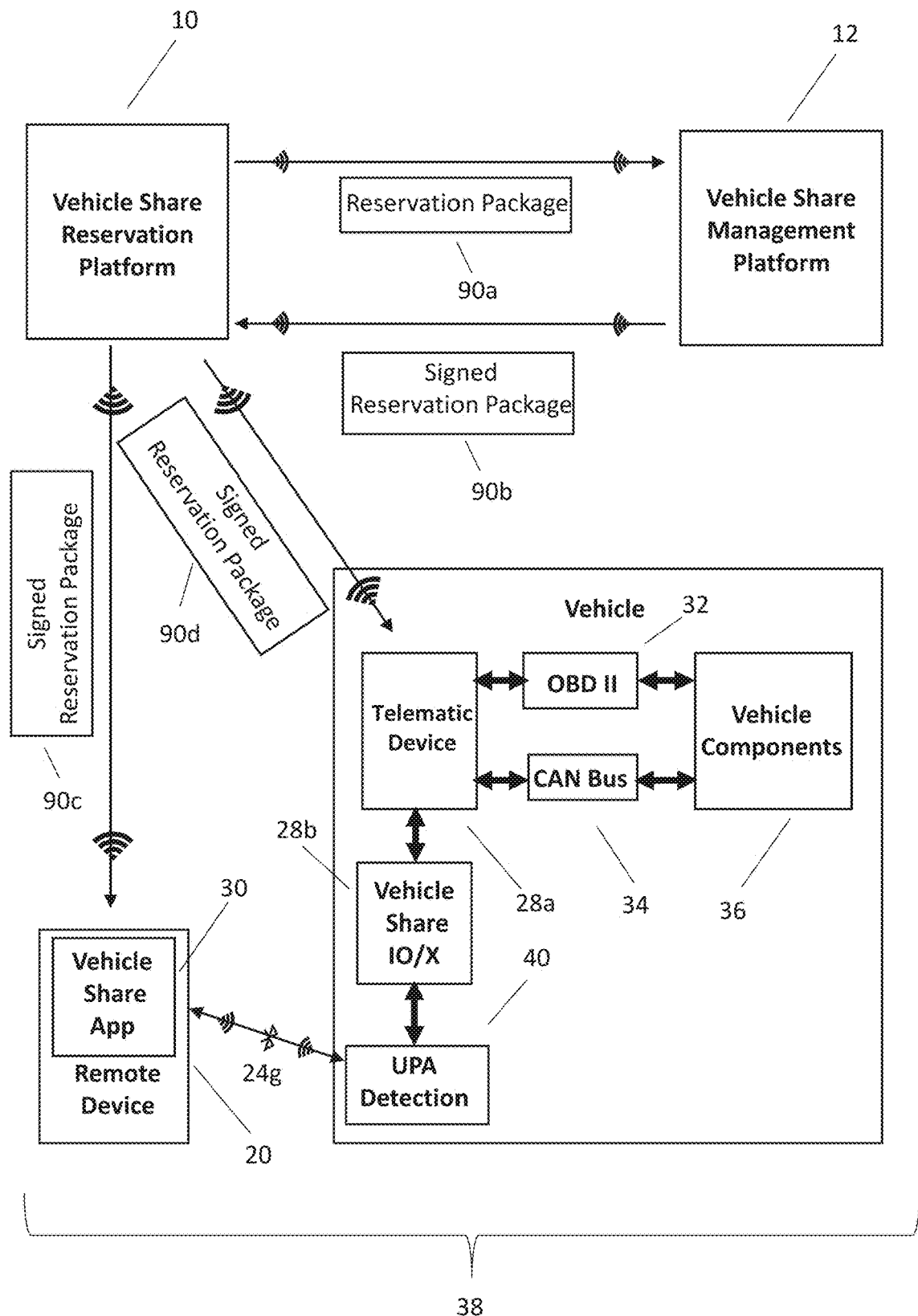
FIG. 2e is a high-level diagrammatic view of a telematic vehicle sharing platform with a vehicle and associated hardware components including reservation packages with reservation data.
Figure 2F:
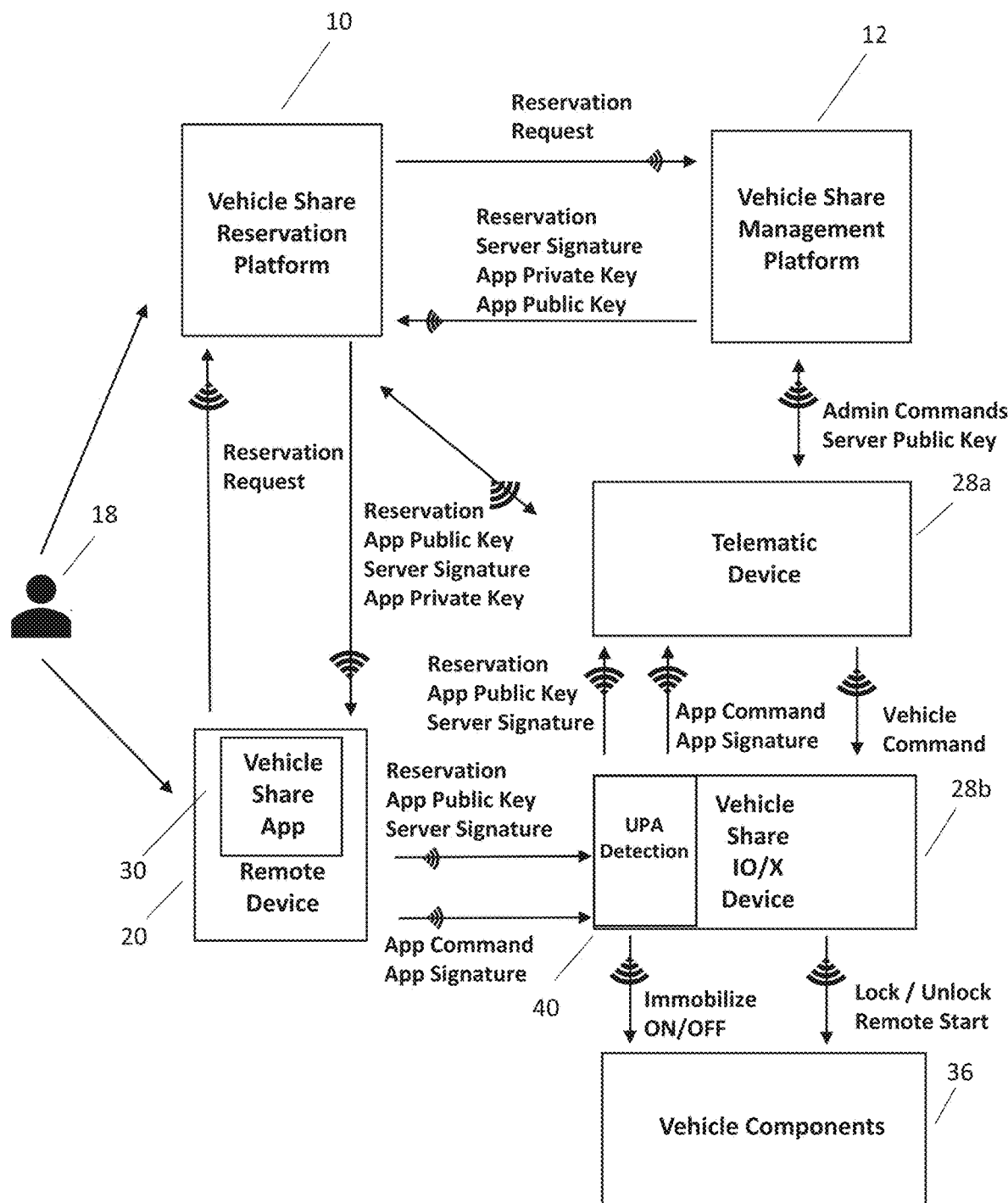
FIG. 2f is a high-level diagrammatic view of a telematic vehicle sharing platform with associated hardware components illustrating data flow and command flow within the system.

A telematic vehicle sharing platform ecosystem is introduced and described with reference to FIGS. 1a, 1b and 1c of the drawings. The telematic vehicle sharing platform ecosystem is generally indicated at 38. The ecosystem includes a telematic vehicle sharing platform. The telematic vehicle sharing platform may be a single platform or a combination of separate platforms performing the functions of vehicle share reservations, vehicle share management and vehicle share analytics. Each platform may include a server or a collection of servers running software. In embodiments, telematic vehicle sharing platform includes a vehicle reservation platform 10 for managing shared vehicle reservations, a vehicle management platform 12 for managing the fleet of shared vehicles, and a vehicle share analytics platform 14 for providing analytic support and data processing to the reservation platform 10 and the vehicle management platform 12. Associated with the vehicle reservation platform 10, the vehicle management platform 12 and the vehicle share analytics platform 14 are telematic devices, servers, software, communications technology and cloud-based technology.

The telematic vehicle sharing platform ecosystem 38 includes a communication network generally indicated at 24 to permit communication between components and devices of the ecosystem. The communication network is generally a mix of communication technologies such as satellite, cellular, WIFI, nearfield and Bluetooth. The vehicle reservation platform 10 is capable for communication 24a in the ecosystem. The vehicle management platform 12 is capable for communication 24b in the ecosystem. The vehicle share analytics platform 14 is also capable for communication 24c in the ecosystem. This communication may occur between the platforms or between servers, components and devices in the ecosystem.

The telematic vehicle sharing platform ecosystem 38 also includes computing devices 16. These devices are capable for communication 24d in the ecosystem and may be stand-alone computers, portable computers, tables or smart devices. Generally, the computing devices provide access to users 18 of the vehicle share system. For example, users 18 may be in the role of reservation services accessing the vehicle reservation platform 10. Users 18 may also be in the role of shared vehicle management accessing the vehicle management platform 12. Users may also be in the role of providing vehicle repair or maintenance accessing the vehicle management platform 12. Users 18 may also be in the role of providing vehicle share fleet management accessing the vehicle share analytics platform 14. Vehicle share users 18 may book reservations using a computer device 16 accessing the vehicle reservation platform 10. Typically, however, users 18 make a reservation through a personal device or smart device such as a smart phone.

A fleet of vehicles for sharing is generally indicated at 26. The fleet may be a mix of vehicles such as cars, trucks or buses. The mix of vehicles may be electric, hybrid, or gas. Each vehicle is equipped with a telematic device 28. The telematic device 28 may be integral to the vehicle 22. Alternatively, the telematic device 28 is added to a vehicle 22. The telematic device 28 is capable for communication 24e with other devices in the ecosystem. The telematic device 28 is for vehicle monitoring, vehicle commands and vehicle sharing capabilities. Vehicle monitoring involves logging and communicating vehicle data, shared vehicle data, and other data to a remote platform. The telematic device 28 is also capable of sending and receiving vehicle commands. The telematic device 28 includes a vehicle interface. There may be more than one vehicle interface. The vehicle interface may be an OBDII interface, or an indirect interface or a physical interface to the vehicle. The telematic device 28 may also include one or more sensors. The sensors may be a biometric sensor for sensing biometric features such as a face, fingerprint, eye or voice. The sensors may be a proximity sensor to sense for example an RFID tag or proximity card. The sensors may be a proximal sensor to sense a proximal device. The proximal device may be a smart phone, a smart watch, a smart fob or a vehicle share app on a smart device. The telematic device 28 may be a sole device. Alternatively, the telematic device 28 may have a first portion 28a and a second portion 28b. The first portion 28a may be a vehicle portion telematic device for monitoring a vehicle and logging vehicle data. The second portion 28b may be a vehicle share portion to enabling or disabling a vehicle share. The second portion 28b may also be a telematic vehicle share I/O expander to expand the functionality of the first portion 28a. Either the first portion 28a or the second portion 28b may send and receive vehicle commands.

Vehicle monitoring by the telematic device 28 provides shared vehicle data to the platforms. Broadly, shared vehicle data provides indications to vehicle share use by each individual during an active reservation. Shared vehicle data also provides indications towards vehicle status and maintenance. Shared vehicle data includes speed data, location data, accelerometer data, engine data, fluid level data (oil, coolant, washer fluid) and energy levels. Energy levels may be battery power, fuel level or a combination of both. Collectively, the shared vehicle data may be combined and assessed to provide indications such as the type of vehicle use or misuse, maintenance, recovery, location and suitability of a vehicle 22 for the next vehicle share or recovery of the vehicle 22. For example, accelerometer data may provide indications of harsh events and a misuse event of the vehicle. Speed data may provide an indication of a misuse event for the vehicle with respect to speeding. Other data may provide indications of other vehicle share events.

Vehicle sharing by the telematic device 28 relates to ensuring there is an actual vehicle reservation by receiving over the communication network 24 a secured personal reservation. A secured personal reservation may be in the form of a reservation package, a secured reservation package and it may contain reservation data. A secured personal reservation may be activated or validated by sensing or receiving a unique personal attribute 20 associated with a user and vehicle reservation. Vehicle sharing permits either unlimited access and use of the shared vehicle or limited access and use to the shared vehicle. In a maintenance mode or event, operation may be restricted to unlock and lock of the shared vehicle. In a cleaning mode or event, operation may also be restricted to unlock and lock of the shared vehicle. The modes and events may also be set by a type or classification of user, for example cleaner. The shared vehicle may also be limited to a date, or a time or a date and time of reservation. A shared vehicle may be limited to specific routes and tracked against a specific route. Alternatively, a shared vehicle may be limited to a geofence area and tracked against the area.

A particular vehicle 22 for sharing may be identified from the vehicle share fleet 26. A first type of identification is through association with a particular telematic device 28 installed or resident within the vehicle. A second type of identification is through association of a secured personal reservation received within the telematic device 28. Access to the particular vehicle 22 is obtained by sensing or detecting the unique personal attribute 20 within proximity to the vehicle 22. One non-limiting way of sensing or detecting the unique personal attribute 20 is through communication 24g with the telematic device 28. Alternatively, the unique personal attribute 20 may be communicated 24f indirectly to the telematic device 28.

The unique personal attribute 20 may be formed as biometric feature data such as a face, fingerprint, eye or voice. It may also be formed as proximal device data such as near field communication with an RFID tag or proximity card or badge. It may also be formed as a personal device such as a smart device, a smart phone, a smart watch, a smart fob or a vehicle share app installed on a smart device.

Communication within the communication network 24 may be impeded with respect to the telematic devices 28. This may occur for example when the vehicle share fleet 26 is stored within a multi-level parking garage. This may limit the telematic device 28 from receiving a secured personal reservation. When this occurs, sensing or detecting the unique personal attribute 20 by the telematic device 28 will not activate the vehicle share reservation. In order to ensure or restore communication within the communication network 24, each of the telematic devices 28 may intercommunicate 24h with other telematic devices 28 in a sequence or chain to establish communication 24e with the communication network 24. This ensures that the telematic devices 28 may receive secured personal reservations that may be validated by the telematic device 28 when sensing or detecting the unique personal attribute 20.

Telematic Device & Vehicle Share Ecosystem

Referring now to FIGS. 2a, 2b, 2c, 2d, 2e and 2f, embodiments of the telematic device 28 and vehicle share ecosystem 38 communication are described.

The telematics device 28 may include a first portion 28a and a second portion 28b. The first portion 28a and the second portion 28b may communicate directly. The first portion 28a may communicate to vehicle components 36 in the vehicle either through an OBDII interface 32 or a CAN Bus interface 34. The first portion may monitor commands and signals concerning the vehicle components 36. Alternatively, the first portion may also send and receive commands and signals to and from vehicle components 36. Vehicle components 36 include various devices for operation and control of the vehicle. For example, vehicle components 36 may be the mechanical components to lock and unlock a vehicle. The first portion 28a may send a command to unlock the vehicle or lock the vehicle thereby actuating the mechanical components to unlock or lock the vehicle. Other vehicle components 36 may be sensors for fluid levels such as oil level, coolant level and washer fluid level. The first portion 28a may send a command to receive a fluid level or the first portion 28a may monitor the vehicle components 36 to obtain a fluid level.

The first portion 28a may also include a GPS 56 capability and an accelerometer 54 capability. The GPS 56 may be monitored to determine the latitude and longitude of the vehicle at a given time or date. The GPS 56 may also be monitored to determine the speed of the vehicle 22. The accelerometer 54 may be monitored to determine accelerations of the vehicle 22 to provide indications of vehicle use or misuse and harsh events. Overall, the first portion 28a and the data associated with the first portion 28a are typically applied to monitoring shared use of the vehicle, utilization management of the shared vehicle, maintenance or recovery of the shared vehicle, communication management, identifying misuse of the shared vehicle and storage management of the shared vehicle. Monitoring occurs from the beginning of an active vehicle share reservation until the completion of a vehicle share reservation. Activation occurs with the unique personal attribute. Completion occurs when the vehicle 22 is properly located and secured.

In an embodiment, the section portion 28b is in the form of a telematic vehicle share I/O expander to expand the functionality of the first portion 28a. The second portion 28b may communicate with the first portion 28a. Typically, vehicle commands and signals may be communicated to vehicle components 36 through the first portion 28a. The second portion 28b may also detect 40 the unique personal attribute 20 associated with a vehicle reservation. When the unique personal attribute 20 is a smart device, such as a vehicle share app 30 disposed with the smart device, the detection is in the form of unique personal attribute communication through communication circuitry 40a. The communication 24g may be from the unique personal attribute 20 or the communication 24g may be from the communication circuitry 40a or the communication 24g may be bidirectional. When the unique personal attribute 20 is a biometric feature, the detection is in the form of reading or sensing through biometric sensor circuitry 40b. When the unique personal attribute 20 is a proximal device, the detection is in the form of reading or sensing through proximity sensor circuitry 40c. Overall, the second portion 28b and the data associated with the second portion 28b are typically applied to confirming a valid vehicle share reservation, activating the vehicle share reservation, identifying the use for the vehicle share reservation, determining permissions or limits, access and control (limited or unlimited) of the vehicle and identifying and validating the user with the vehicle share reservation.

In embodiments, communication is structured within the vehicle share ecosystem 38. The vehicle share analytics platform 14 may communicate 24c with the vehicle share management platform 12. The vehicle share management platform may also communicate 24b with the vehicle share analytics platform 14. The vehicle share management platform 12 may communicate 24b with the first portion 28a which in turn may communicate 24e with the vehicle share management platform 12. The vehicle share platform 12 may communicate 24b with the vehicle share reservation platform 10 and the vehicle share platform 12 may communicate 24a with the vehicle share reservation platform 10. The vehicle share reservation platform 10 may communicate with the first portion 28a which in turn may communicate 24e with the vehicle share reservation platform 10. The vehicle share reservation platform 10 may communicate 24a with computing devices 16. Computing device 16 may also communicate 25d with the vehicle share reservation platform 10. Computing device 16 may also include smart devices. Alternatively, the vehicle share reservation platform 10 may communicate with unique personal attributes 20, for example, a smart device or a vehicle share app 30 disposed with a smart device.

In an embodiment, the vehicle share reservation is managed in the form of a reservation package 90a and a signed reservation package 90b. The reservation package 90a contains vehicle share reservation data and security data relating to the unique personal attribute. The signed reservation package 90b also contains vehicle share reservation data and security data to ensure a reservation package 90a is associated to a unique personal attribute 20. This creates a secured personal reservation in the form of a reservation authentication. The reservation package 90a and reservation data identifies the user, the vehicle, the user authentication, the role of the use and any restrictions of use or predefined control (limited or unlimited). The reservation data may also include the purpose of vehicle use, a preferred start location, a preferred stop location, the type or class of vehicle 22, the length of time for the use, the distance required for the use, energy required for the use and the pickup parked location of the vehicle 22. The use may be classified into types or events such as driving, cleaning, maintenance or recovery. Classification may also include combinations and subclassifications. Restrictions may be classified into vehicle share permissions or vehicle share limits or both permissions or limits such as a date and time, activities such as check in, check out, normal, late, recovery or vehicle controls and commands such as lock, unlock, start, operation, routing, geofence or time period. The reservation data and vehicle share controls and commands may be grouped into activities such as maintenance, recovery or cleaning. The signed reservation package 90b provides a level of security to the reservation package 90a. The signed reservation package 90b may provide security in the form of a digital key with a lifetime and expiry or other forms of security such as biometric data. The initial reservation request becomes a validated reservation request through the process.

In an embodiment, the vehicle share reservation platform 10 receives a reservation request and formulates the reservation package 90a. The vehicle share reservation platform 10 creates a validated reservation request associated with a unique personal attribute of a particular user. This may be thought of as a personal reservation. The reservation package 90a is communicated to the vehicle share management platform 12. The vehicle share management platform modifies the reservation package 90a and creates the signed reservation package 90b. A signed reservation package 90b may also be considered a secured personal reservation. The signed reservation package 90b is communicated to the vehicle share reservation platform 10. The reservation platform 10 communicates the signed reservation package 90d to the telematic device 28. In embodiments, the telematic device 28 is the first portion 28a. A handshake may occur between the telematic device 28 and the vehicle share reservation platform 10 to indicate the success or failure of receiving the signed reservation platform 90d. The telematic device 28 may also receive one or more signed reservation packages and may be updated to include a late check out if required by the user. While the vehicle share reservation platform 10 and the vehicle share management platform 12 are illustrated as two separate systems, they may be integrated into a single one platform option.

In an embodiment, the user 19 creates a reservation request either from a computing device 16 or a unique personal attribute 20 such as a vehicle share app 30 disposed on a smart device. The vehicle share reservation platform 10 processes the request to manage the fleet of shared vehicles 26, the users and the all reservations. The vehicle share management platform 12 receives the reservation request in the form of a reservation package 90*a* and securely signs the reservation request. The reservation package 90*a*, including a server signature, app private key and app public key are communicated to the vehicle share platform 10. The vehicle share management platform 12 also communicates administrative commands and the server public key to the telematic device 28. In addition, the vehicle share reservation platform 10 may communicate the reservation package and administrative commands to the telematic device 28. The vehicle share reservation platform 10 communicates the reservation package, app public key, server signature and app private key to the unique personal attribute 20, or vehicle share app 30 in embodiments. In embodiments, the unique personal attribute 20 is detected and the second portion 28*b* receives the reservation package, app public key and server signature. The reservation package, app public key and server signature may be communicated to the first portion 28*a* for validation. Upon validation, the second portion 28*b* manages immobilization and use of the vehicle by interacting with vehicle components 26 to activate or deactivate immobilization and to lock or unlock doors or to start an engine.

In other embodiments, the reservation package 90*a* may include different forms of security for example biometric data to validate a biometric unique personal attribute 20 or proximity data to validate a proximity unique personal attribute 20. In other embodiments, the different forms of security may be combined or complement each other including server signatures, private keys and public keys.

Telematic Device

Figure 3A:
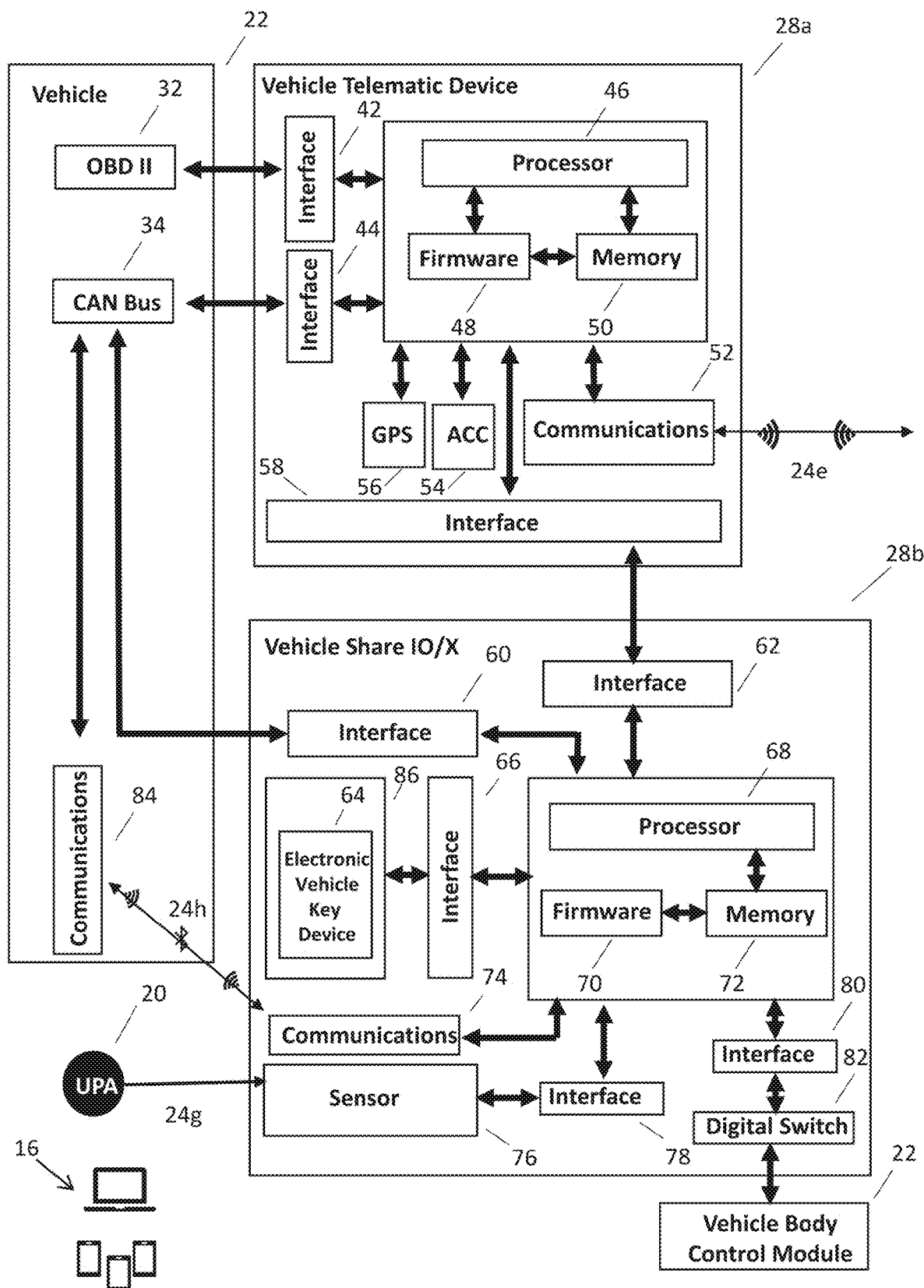
FIG. 3a is a high-level diagrammatic view of the telematic vehicle sharing hardware including a vehicle, telematic device and telematic vehicle share I/O expander with a unique personal attribute sensor interface.
Figure 3B:
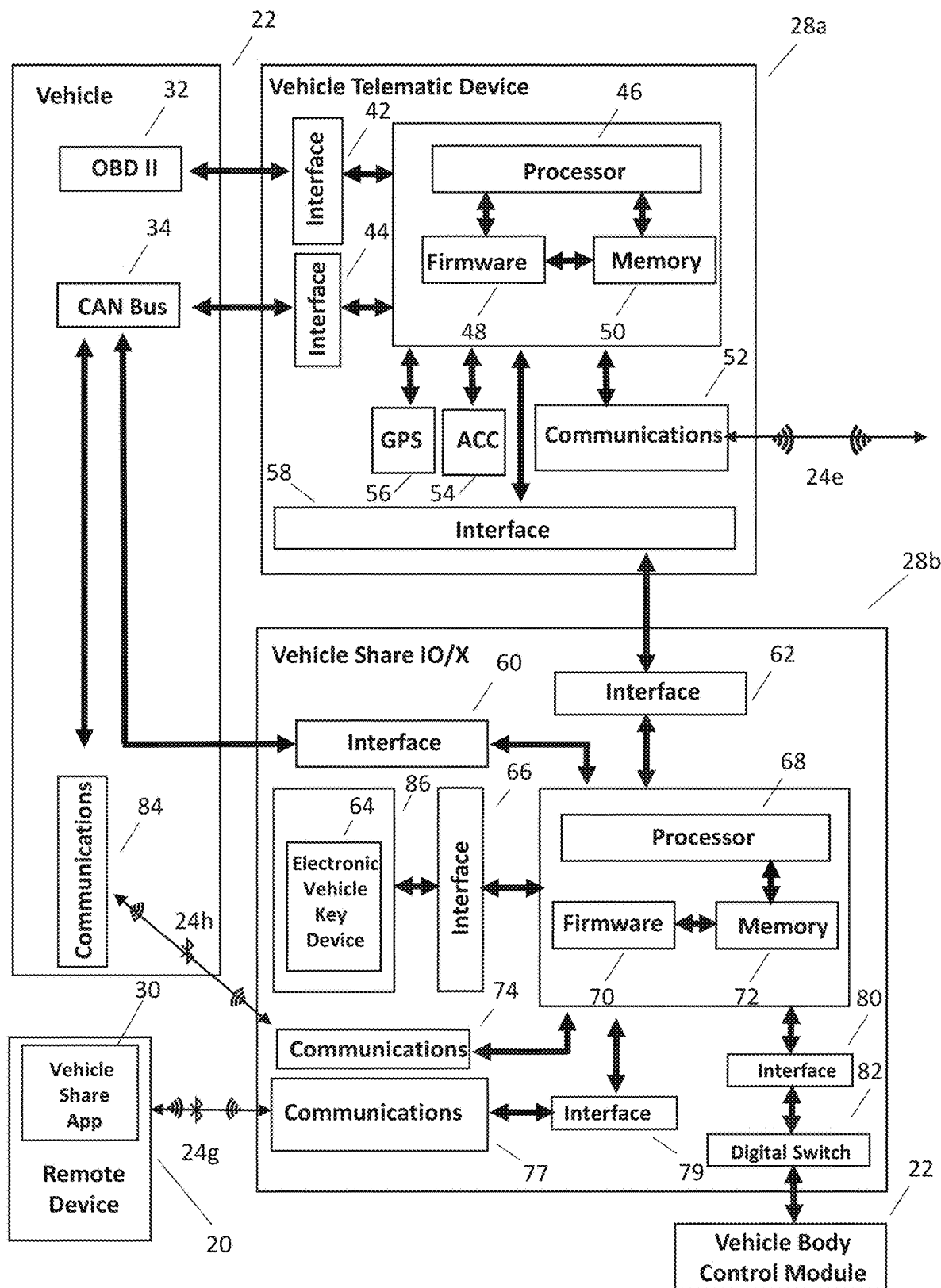
FIG. 3b is a high-level diagrammatic view of the telematic vehicle sharing hardware including a vehicle, telematic device and a telematic vehicle share I/O expander with a unique personal attribute communications interface.
Figure 3C:
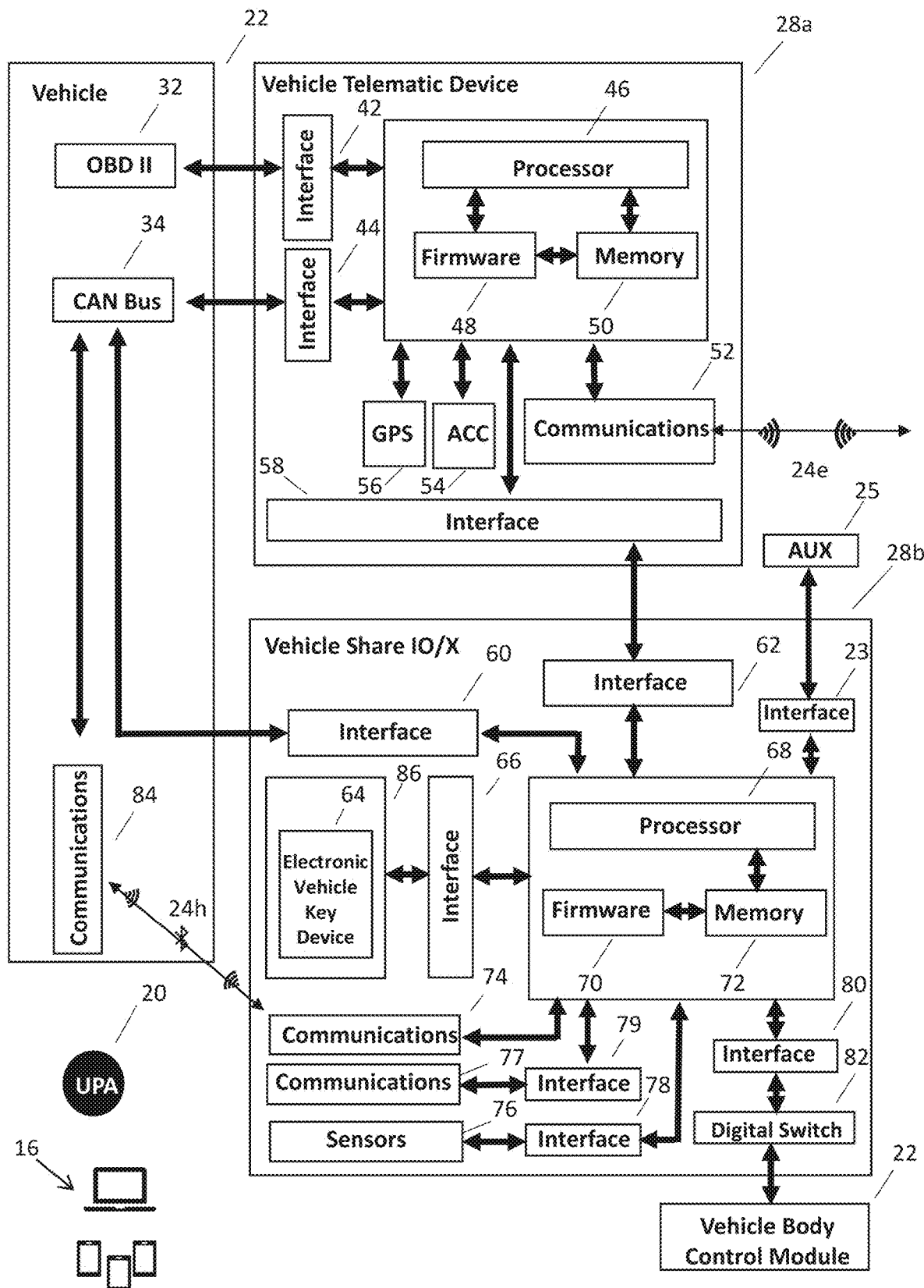
FIG. 3c is a high-level diagrammatic view of the telematic vehicle sharing hardware including a vehicle, telematic device and a telematic vehicle share I/O expander with a plurality of interfaces including an auxiliary interface.

Referring next to FIGS. 3*a*, 3*b* and 3*c*, embodiments of the telematic device 28, relationships to the vehicle 22 and vehicle systems and related functionality is described.

The telematic device 28 may include a first portion 28*a*. The first portion 28*a* is a vehicle telematics device. The first portion 28*a* includes a processor 46, firmware 48 and memory 50 to control and operate the functionality of the first portion 28*a*. The first portion 28*a* also includes GPS circuitry to receive latitude, longitude, speed, time and date data as well as accelerometer circuitry to receive accelerometer data. The primary functionality of the first portion 28*a* is for monitoring vehicle components, the GPS circuitry, accelerometer circuitry, logging the associated data, logging engine data, logging vehicle data, logging vehicle share data and communicating the data to a remote platform through the communications circuitry 52. A secondary function is to receive from the remote platform through the communications circuitry 52 vehicle share reservation packages and reservation data. The communications circuitry 52 permits bidirectional communication with the vehicle share reservation platform 10 and the vehicle share management platform 12.

The first portion 28*a* also includes a number of interfaces. An internal interface 58 communicates with the processor 46, firmware 48 and memory 50 to permit bidirectional communication with the second portion 28*b*, a vehicle share I/O expander device. The bidirectional communication is to send and receive commands, control signals and data. There is also at least one external interface (42, 44) to couple with the vehicle 22 and associated circuitry. The at least one external interface are vehicle interfaces between the vehicle bus and the first portion 28*a*. A first external interface 42 couples the first portion 28*a* to and OBDII 32 interface in the vehicle. This permits monitoring of the vehicle bus, sending commands, receiving commands, sending data, receiving data between the vehicle bus, vehicle components and the first portion 28*a*. A second external interface 44 couples the first portion 28*a* to the vehicle CAN bus 34. This permits an alternate form of connection for monitoring the vehicle bus, sending commands, receiving commands, sending data, receiving data between the vehicle bus, vehicle components and the first portion 28*a*.

The telematics device 28 may also include a second portion 28*b*. The second portion 28*b* is a telematic vehicle share I/O expander device. The second portion 28*b* includes a processor 68, firmware 70 and memory 72 to control and operate the functionality of the second portion 28*b*. The Primary functionality of the second portion 28*b* is for enabling vehicle functions, enabling a defined set of controls, disabling vehicle functions, determining a valid vehicle share user through a unique personal attribute 22, determining a valid vehicle share reservation, determining vehicle share use, determining vehicle share permissions or limits, sending vehicle commands and signals to the vehicle 22, receiving vehicle commands and signals from the vehicle 22, sending vehicle data to the vehicle 22, receiving vehicle data from the vehicle 22. The secondary function of the second portion 28*b* is for communicating with the first portion 28*a* through an internal interface 62 to exchange commands and data and to receive reservation data. The second portion 28*b* includes at least one way to communicate with the vehicle 22 and to activate or deactivate the vehicle 22. This may be through an electronic vehicle key device, emulation of an electronic vehicle key device or through a digital switch 82 to a vehicle body control module and vehicle bus disposed with the vehicle 22. The digital switch 82 is a form of direct connection to the vehicle bus in the vehicle 22.

In an embodiment, there is an internal interface 66 to couple the processor 68, firmware 70 and memory 72 to an electronic vehicle key device 64. The electronic vehicle key device is enclosed in a section of the second portion 28*b* that restricts or prevents sensing and communication between the electronic vehicle key device 64 and the communications 84 capability of the vehicle 22. In an embodiment, the second portion 28*b* controls the activation and deactivation of the electronic vehicle key device 64 to communicate signals, commands and data from the electronic vehicle key device 64 to the vehicle 22. Alternatively, signals, commands and data from the electronic vehicle key device 64 are internal to the second portion 28*b* and the second portion 28*b* is capable to emulate or replicate the signals, commands and data to the vehicle 22. In an embodiment, this is achieved through communications circuitry 74 disposed with the second portion 28*b* and communications circuitry 84 disposed with the vehicle 22. In an embodiment, the second portion 28*b* control activation and deactivation of the engine through an interface 80, a digital switch 82 or relay connected to wires on the vehicle bus and the vehicle control module disposed with the vehicle 22.

In an embodiment, the first portion 28*a* receives vehicle share reservation data. The reservation data is either accessed by the second portion 28*b* or communicated to the second portion 28*b*. This occurs between the interface 58 in the first portion 28*a* and the interface 62 in the second portion 28*b*. The reservation data contains data concerning the user identification and the reservation. The user identification data may be one of a public key and private key when the unique personal attribute 20 is a smart device, or biometric data when the unique personal attribute 20 is based upon biometric features, or proximity data when the unique personal attribute 20 is based upon proximity devices. The reservation data may be one of reservation time, or reservation date, or vehicle share permissions or limits, or vehicle share use or vehicle share classification type.

In an embodiment, the unique personal attribute 20 is based upon biometric features and data. The biometric features and data may be a face, a fingerprint, a voice or an eye. Sensor circuitry 76 obtains the biometric data and communicates the biometric data through an internal interface 78 to the processor 68, firmware 70 and memory 72. The firmware 70 and processor 68 processing the biometric data in comparison with a portion of the reservation data for user identification with the reservation. When there is a match, the user has access to the vehicle as permitted by the reservation data.

In an embodiment, the unique personal attribute 20 is based upon proximity devices and proximity data. Sensor circuitry 76 obtains the proximity data and communicates the proximity data through an internal interface 78 to the processor 68, firmware 70 and memory 72. The firmware 70 and processor 68 processes the proximity data in comparison with a portion of the reservation data for user identification with the reservation. When there is a match, the user has access to the vehicle.

In an embodiment, the unique personal attribute 20 is based upon a smart device or vehicle share app 30. Communications circuitry 77 obtains the security data from the smart device or vehicle share app 30 in the form of secured permissions data. The secured permissions data is provided to the processor 68, firmware 70 and memory 72 through the internal interface 78. The firmware 70 and processor 68 process the secured permissions data in comparison with apportion of the reservation data for user identification with the reservation. A match based upon public and private keys permits the user to access the vehicle.

In an embodiment, the firmware 70 and processor 68 may include electronic vehicle key device 64 specific monitoring and simulation of an electronic vehicle key device 68 for specific button selection. The monitoring may work for different electronic vehicle key device 68 hardware configurations where either end of the button could be normally a high or low value. The different configurations may also include a different number of buttons that are simulated. An actuation validation process runs when a command is issued to actuate one of those buttons. Two inputs may be monitored when the button is depressed or released. This supports either end being a normally high or low without the need to know the actual hardware configuration of the electronic vehicle key device 68.

On power up, the firmware 70 and processor 68 may also include a health check process. This process checks the connection of the electronic vehicle key device 64 buttons. This is accomplished without powering up the electronic vehicle key device 64 as that would unintentionally actuate the buttons during the health check process. The process ensures the power to the electronic vehicle key device 64 is off so that functions cannot be triggered. Then, weak pull-up resistors are enabled. Check to determine if lines cannot be pulled to a high state. Then disable the pulling resistors and check if the line was supposed to be connected based on the stored configuration of the electronic vehicle key device 64 buttons. Report a fault if required.

After the second portion 28b validates the reservation, the user and vehicle share reservation data, as a minimum the user has access to the vehicle 22 and may unlock and lock the doors on the vehicle 22. The minimum user access is dependent upon the vehicle share reservation data including permissions or limits or user roles. For example, if the user role or activity is cleaning the vehicle, then unlock and lock are the only available controls to the user of the vehicle 22. The function of unlocking and locking the doors on the vehicle 22 is controlled by the second portion 28b communicating with components in the vehicle 22. The communication occurs through at least one of the interface 60 and the CAN bus 34, or communications circuitry 74 or communications circuitry 84 or the digital switch 82 and the vehicle body control module. In addition, dependent upon the permission or user role, the user may have access to starting the vehicle. The function of starting the vehicle 22 is also controlled by the second portion 28b communicating with components in the vehicle 22. The communication occurs through at least one of the interface 60 and the can bus 34 or the digital switch 82 and the vehicle body control module in the vehicle 22. Other user roles and activities permit either unlimited access and control or different combinations of access and control for the vehicle 22.

The second portion 28b may also include another external interface 23 to attach other auxiliary devices 25. In an embodiment, the auxiliary device 25 is a video device. The video device or devices may be located within the vehicle 22 and provide image data to the second portion 28b that may be communicated to a remote platform. One use of the video device is facial recognition to ensure the correct user is operating the vehicle 22 and to report a misuse event in the case wherein it is an incorrect user. Another use is to view the inside of the vehicle 22 after use to determine if cleaning is required or if objects were left in the vehicle 22. Another use is to view the cargo area of the vehicle 22 also to determine cleaning or if objects were left in the cargo area of the vehicle 22. In an embodiment, the auxiliary device 25 is an odor detecting device. The odor detecting device or devices may be located within the vehicle 22 or cargo area of the vehicle 22 and provide odor data to the second portion 28b that may be communicated to a remote platform. A use of this device is to determine if cleaning is required or the type of cleaning required.

In summary, the telematics device 28 may be a single device or a combination of devices. In embodiments, the telematics device 28 includes a first portion 28a and a second portion 28b. The first portion 28a includes logic for monitoring, logging and communicating engine data, vehicle data, vehicle share data, GPS data and accelerometer data. In addition, the first portion 28a identifies vehicle share data representative of a vehicle share reservation. The vehicle share data is also monitored, logged and communicated to a remote device. The second portion includes logic for validating a user with a vehicle share reservation and permitting control of the vehicle 22. Control of the vehicle may be limited to unlock and lock or unlimited to further include start and stop of an engine. The second portion determines the validity of the vehicle share user and the vehicle share reservation. The second portion also determines the vehicle share use and the vehicle share permissions or limits. The first portion 28a and the second portion 28b operate concurrently and in parallel.

Vehicle Share Reservation Logic

Figure 4:
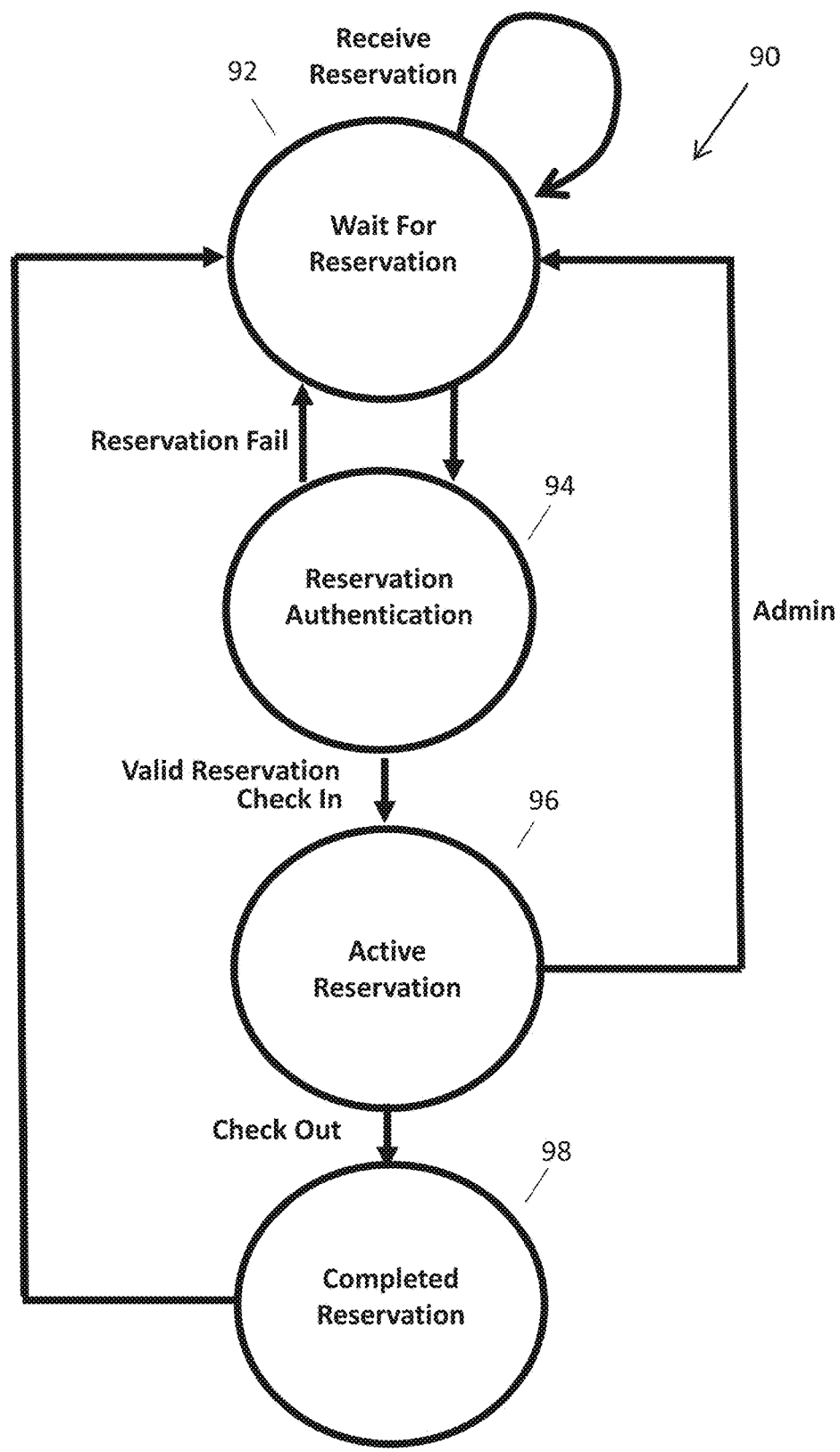
FIG. 4 is a state machine representation of the distributed vehicle sharing logic.

Vehicle share reservation logic is next described with reference to the state machine diagram of FIG. 4 and the flowcharts of FIGS. 5-9 inclusive. The vehicle share reservation logic is distributed through at least one computer device 16 or at least one smart device, the vehicle share platform 10, the vehicle management platform 12 and the telematic device 28. The platforms may be distributed platforms or a single platform. The telematic device 28 may be a single device or multiple devices. While the embodiment is distributed, the vehicle share reservation logic may be implemented in one or more platforms and devices.

The distributed vehicle sharing machine logic 90 begins with the wait for reservation state 92. The vehicle share platform 10 waits to receive a reservation request from a computer device 16 or a smart device. Upon receipt of a reservation request, the reservation data is formulated into a reservation data package. The reservation data package is validated by the vehicle share platform 10 to become a validated reservation and the reservation data package is communicated to the vehicle management platform 14. Validation relates to the vehicle share user, date and time of the reservation and availability of the vehicle 22. Then, the state changes to reservation authentication 94. In the reservation authentication 94 state the reservation package is operated upon to become a secured reservation package. The secure reservation package may contain a private key and a public key for the case of a unique personal attribute 20 being a smart device. The reservation package may also contain biometric data for the case of a unique personal attribute 20 being a biometric feature. The reservation package may also contain proximity data for the case of a unique personal attribute 20 being a proximity device. Upon completion of the authenticated reservation, the secured reservation package is communicated to the vehicle share reservation platform 10 and the telematic device 28. In an embodiment, the first portion 28a and the second portion 28b have access to the secured reservation package and the corresponding reservation data. The state machine logic then waits for an activation of the reservation by a user and a vehicle 22.

The active reservation state 96 occurs when there is a valid and secured reservation package and a valid check in by a user with a unique personal attribute 20. The unique personal attribute 20 when validated by the telematic device 28 with a valid and secured reservation package and reservation data activates the reservation and provides access and control to the vehicle 22 based upon the contents of the secured reservation package and reservation data. The active reservation state provides an indication of the active reservation to the wait for reservation state 92 in the form of administration data. The active reservation state 96 terminates with a check out by a user which then begins the completed reservation state 98. The completed reservation state 98 communicates an indication of the completed reservation in the form of administration data to the wait for reservation state 92. In embodiments, the completed reservation state 98 communicates the vehicle share data to the wait for reservation state.

Figure 5:
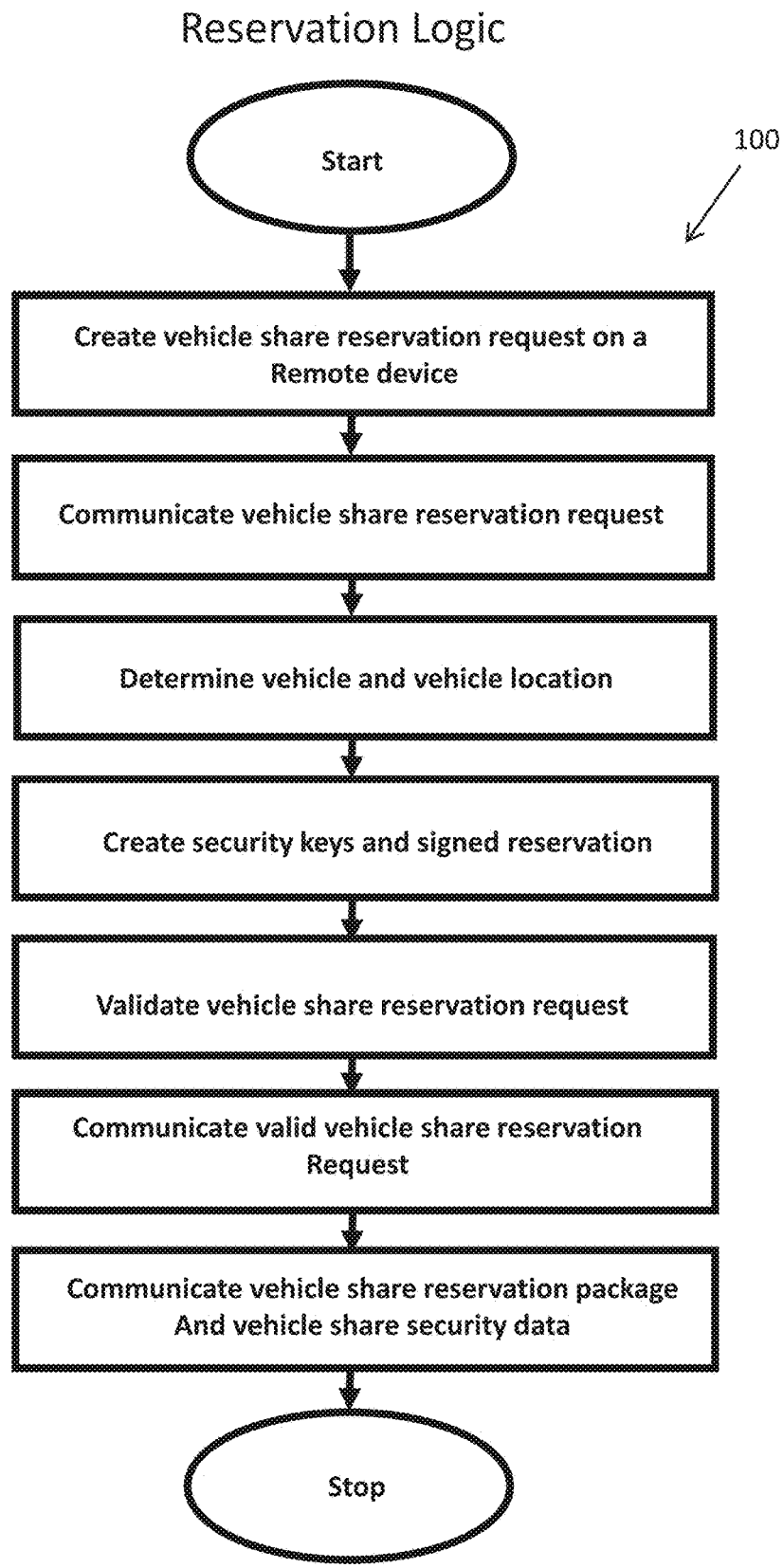
FIG. 5 is a flow chart representation of the reservation logic.
Figure 6:
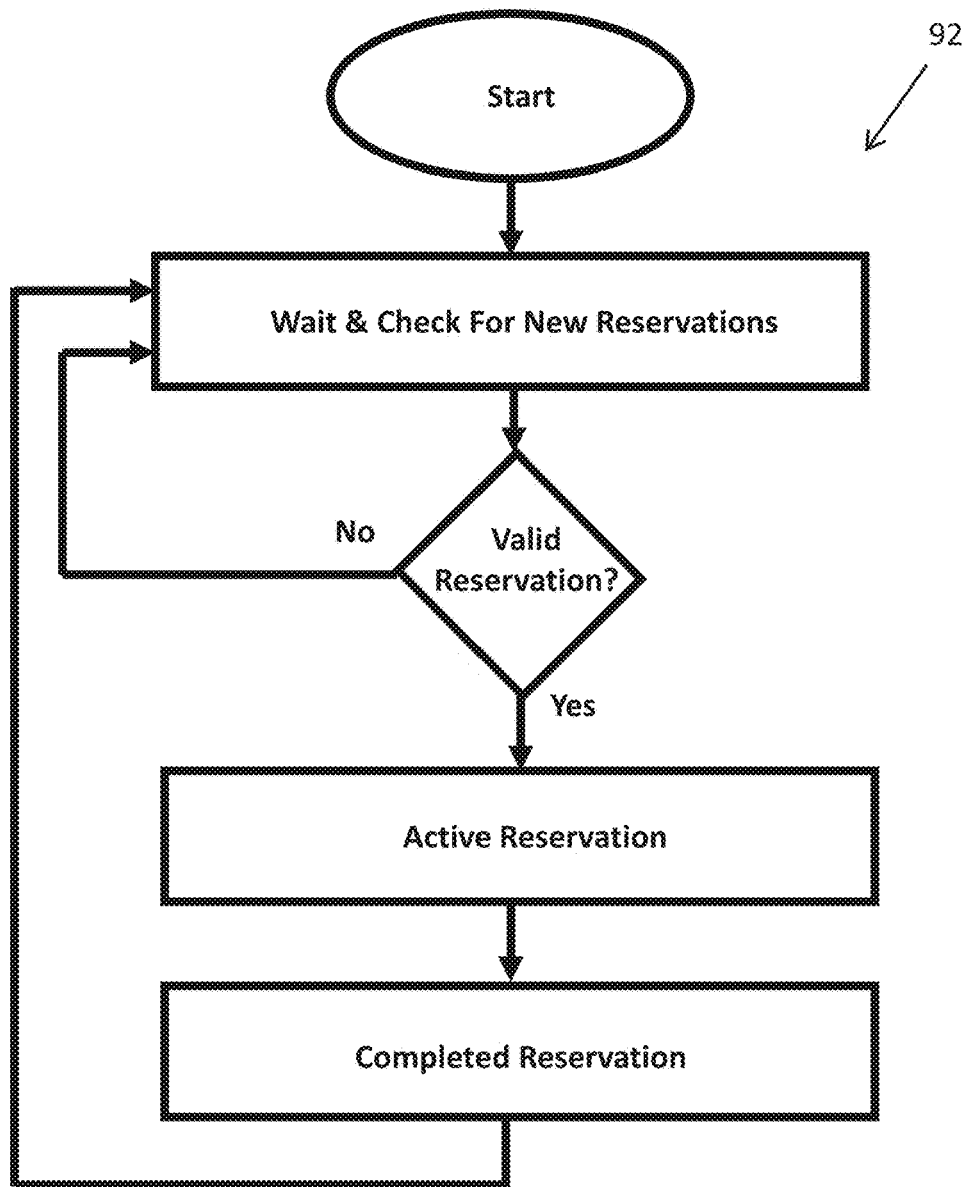
FIG. 6 is a flow chart representation of the wait for reservation logic.
Figure 7:
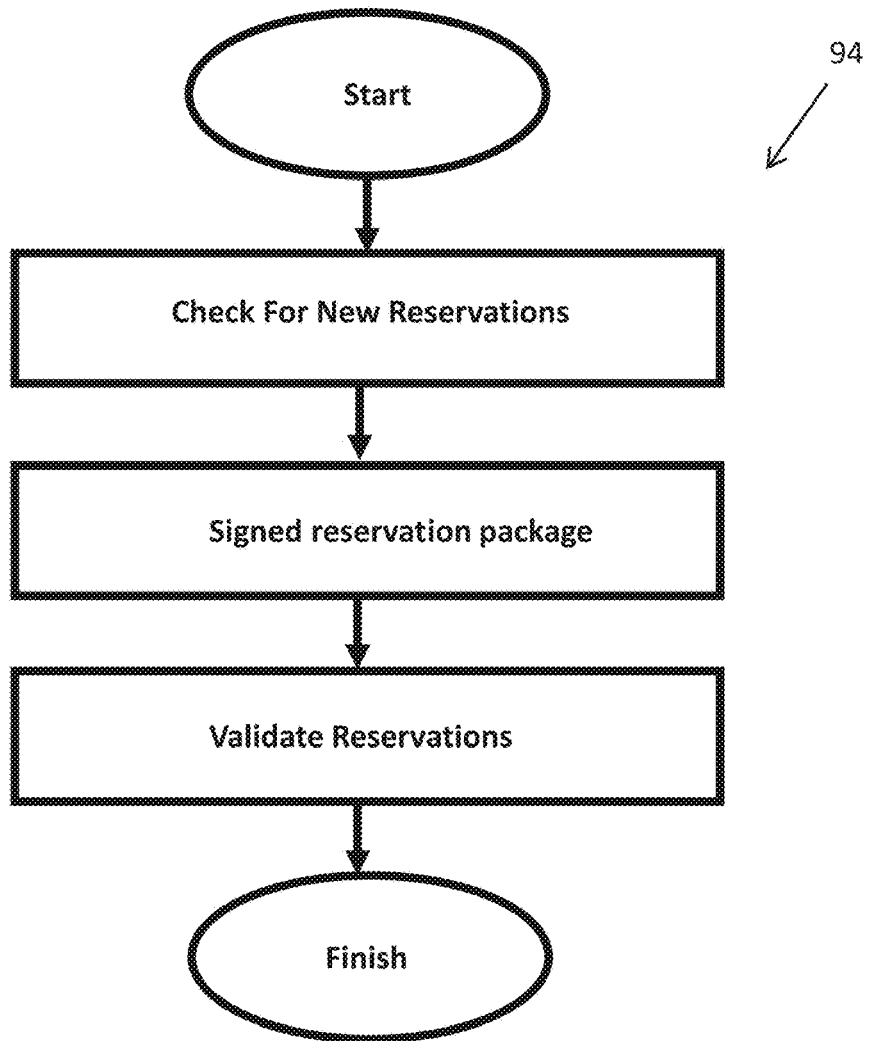
FIG. 7 is a flow chart representation of the reservation authentication logic.
Figure 8:
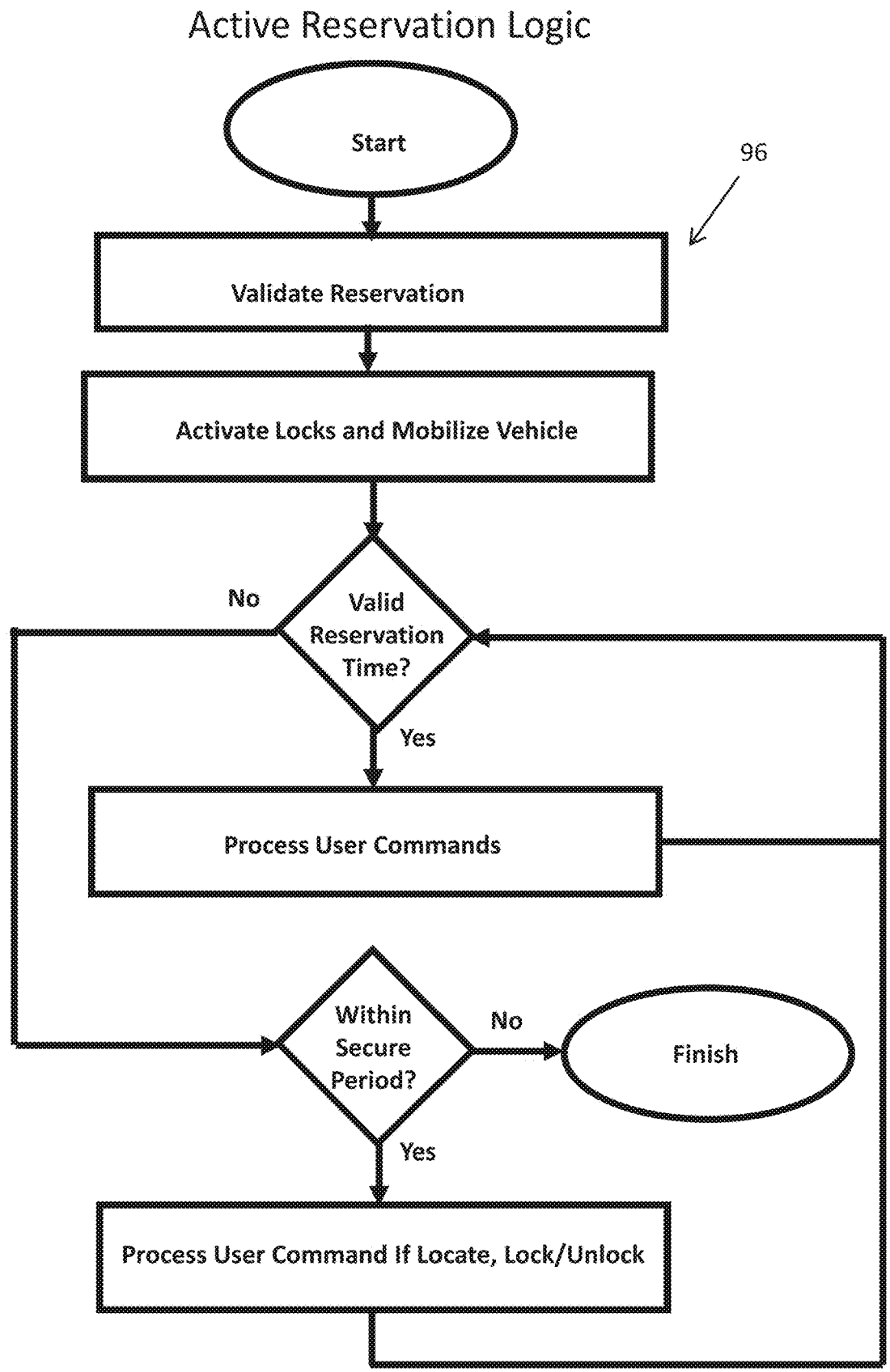
FIG. 8 is a flow chart representation of the active reservation logic.
Figure 9:
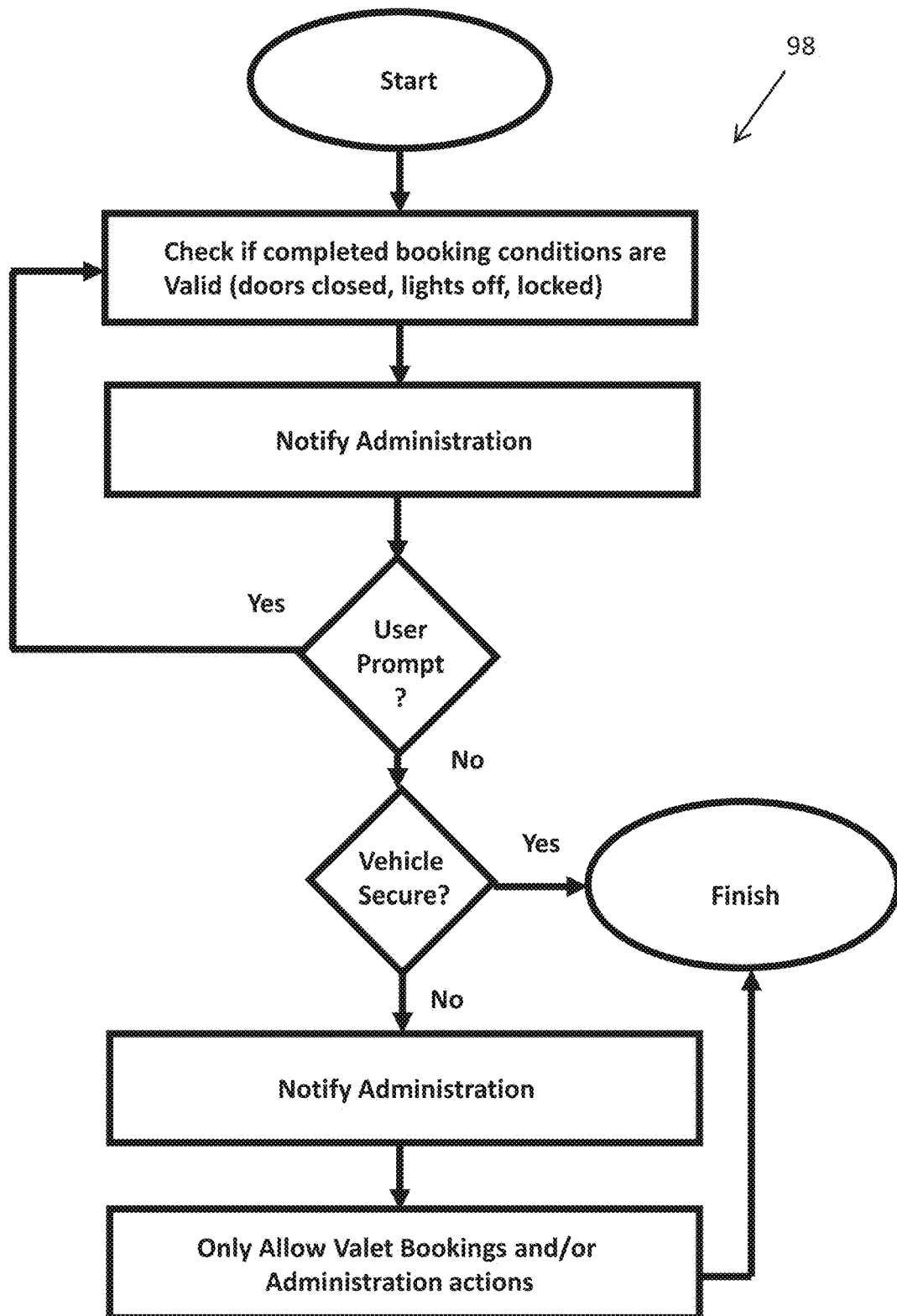
FIG. 9 is a flow chart representation of the completed reservation logic.

The reservation logic is next described with reference to FIG. 5. The reservation is created by a user operating a remote device such as computing device 16 or a smart device. The reservation request will permit one or more options such as early check in, normal check in or late check in with the vehicle 22, type of vehicle, purpose of vehicle use, preferred start location, preferred stop location, vehicle type, length of use, distance required, energy required. The user may also enter a role or type of vehicle share such as operator, cleaner, maintenance or recovery. The user may also select a pickup location of the vehicle 22 and a drop off location of the vehicle 22. This formulates the reservation data. The completed reservation request is communicated with the unique personal attribute 20 to the vehicle share reservation platform 10.

The vehicle share reservation platform 10 then determines the available vehicles 22 and available vehicle locations with respect to the desired pickup location and the desired drop off location. The vehicle share reservation platform 10 determines the best fit and convenience between the locations to select one of the available vehicles 22. The vehicle share reservation platform 10 also creates vehicle share permissions or limitations based upon the role or type of vehicle share. The permissions may be unlimited or limited. Limitations relate to the type or amount of control available by the vehicle 22 or routing limitation or geofence limitations. The reservation data is then formulated into a reservation package and communicated to the vehicle share management platform 12.

The vehicle share reservation platform 10 may also determine a location match between a user and an available vehicle 22. The location match may be based upon location data and a distance threshold. In this case, there is an acceptable distance between the customer and the pick-up location of the vehicle, less distance is a better match and longer distance is a degraded match. If the distance is to far the vehicle 22 may not be acceptable to the user and an incentive may be offered to the user to accept the location of the vehicle 22. Alternatively, the vehicle share reservation platform 10 may determine an energy match between the user requirements and the available energy in the vehicle 22. There may also be an energy/fuel threshold. The energy/fuel threshold is an energy/fuel minimum amount required to start the vehicle share reservation. In this case, there is an acceptable amount of energy/fuel in the vehicle for the desired distance or energy/fuel required by the user. If the energy/fuel is too little, it may not be acceptable to the user and an incentive may be offered to the user to accept the vehicle 2. This permits a best match or a degraded match between the user and the vehicle 22.

The vehicle share management platform 12 receives the reservation package and creates the necessary security to sign the reservation package. The necessary security may be based upon keys (app/private), biometric features or proximity devices. The reservation package is also validated. The validated and signed reservation package is then communicated back to the vehicle share reservation platform 10 and the telematic device 28. In embodiments wherein the telematic device 28 includes two portions, the first portion 28a receives the validated and signed reservation package and reservation data. The second portion 28b accesses the reservation data from the first portion 28a. For the case of a smart device, the validated and signed reservation package may also be communicated to a smart device.

The wait for reservation logic 92 runs on the vehicle share reservation platform 10 and begins with the initial state of waiting for reservations. A valid reservation is determined as previously described and when a validation is received, the process proceeds to an active reservation. The active reservation stays active during the timeframe of the reservation and may also be active for the case of an early check in as well as a late check out. The active reservation may expire during these timeframes if not completed. When the active reservation expires, an indication is provided to the wait and check for new reservations process to make the reserved vehicle available to addition new reservations. During an active reservation, the unique personal attribute 20 permits access and control of the vehicle. The reservation is normally completed when the user with the unique personal attribute 20 associated with the reservation locks the vehicle 22 doors at the defined parking locations. An indication is provided to the wait and check for new reservations process. Depending upon the indication, the vehicle may be available for the next reservation, or the vehicle may require cleaning, or the vehicle may require maintenance or recovery.

The reservation authentication logic 94 receives a new reservation, validates and securely signs the reservation and creates a validated reservation in the form of a validated and secured reservation package with reservation data. The active reservation logic 96 validates the reservation with the unique personal attribute 20 and the reservation data. In an embodiment, a check-in override may occur to accommodate being late or early with respect to a reservation. The override includes four states or privileges. A check-in override state allows incoming users to check-in overtop of an existing user. A vehicle insecure period state may occur at the expiration time of a reservation where the vehicle attempts to automatically lock/secure itself by automatically submitting a lock and inhibit start command. A check-out failure state may occur if there are conditions which would traditionally cause a check-out operation to fail, these are overridden with the state enabled. A reset at end of booking state may occur at the expiry time of a reservation to automatically reset the booking state regardless of vehicle condition at the time to allow a new user to access the vehicle.

The valid reservation permits activation of door locks and dependent on the reservation data permissions, mobilization of the vehicle 22. During the valid reservation time, the user may send commends to the vehicle 22 and dependent upon the reservation data permissions and limitations, the vehicle commands will be processed actively with the vehicle 22. When the valid reservation time expires, the active reservation logic 96 determines if the vehicle is properly secured to complete the active reservation and permits the user to lock or unlock the vehicle 22 as required. The completed reservation logic 98 checks to determine if the completed reservation conditions are complete. These conditions may include one or more of the doors closed, lights off, vehicle 22 locked or specific vehicle location. When the reservation has either been completed or timed out, a notification including vehicle share data is provided to an administrator associated with the vehicle share reservation platform 10. In embodiments, a user prompt may occur from the vehicle share platform 10 to have the user correct incomplete conditions. Alternatively, the telematic device 28 may provide an indication to a smart device associated with the user. When the vehicle 22 is secure, the reservation is completed. In the situation where the telematic device 28 determines the vehicle 22 has not been secured or all of the conditions have not been met, an administrator associated with the vehicle share reservation platform 10 is notified. When the vehicle 22 has not been properly secured or the conditions for completion have not been met, the system only permits valet bookings or administrative actions with the vehicle 22 such as maintenance or recovery to property restore the vehicle to a sharable state for the next user. In addition, the indications between the user and the administrator may be automated indications.

Vehicle Sharing & Vehicle Share Monitoring

Figure 10A:
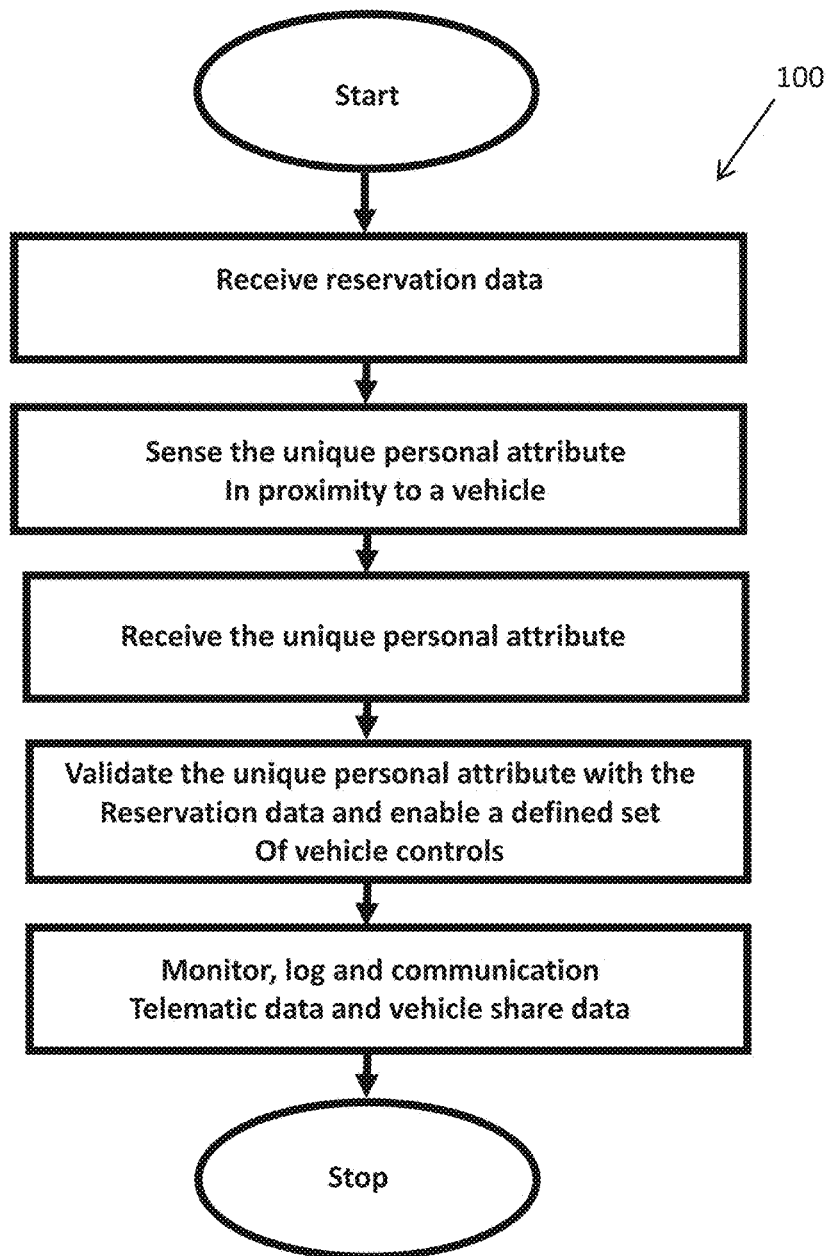
FIG. 10a is a flow chart representation of telematic vehicle sharing and monitoring.
Figure 10B:
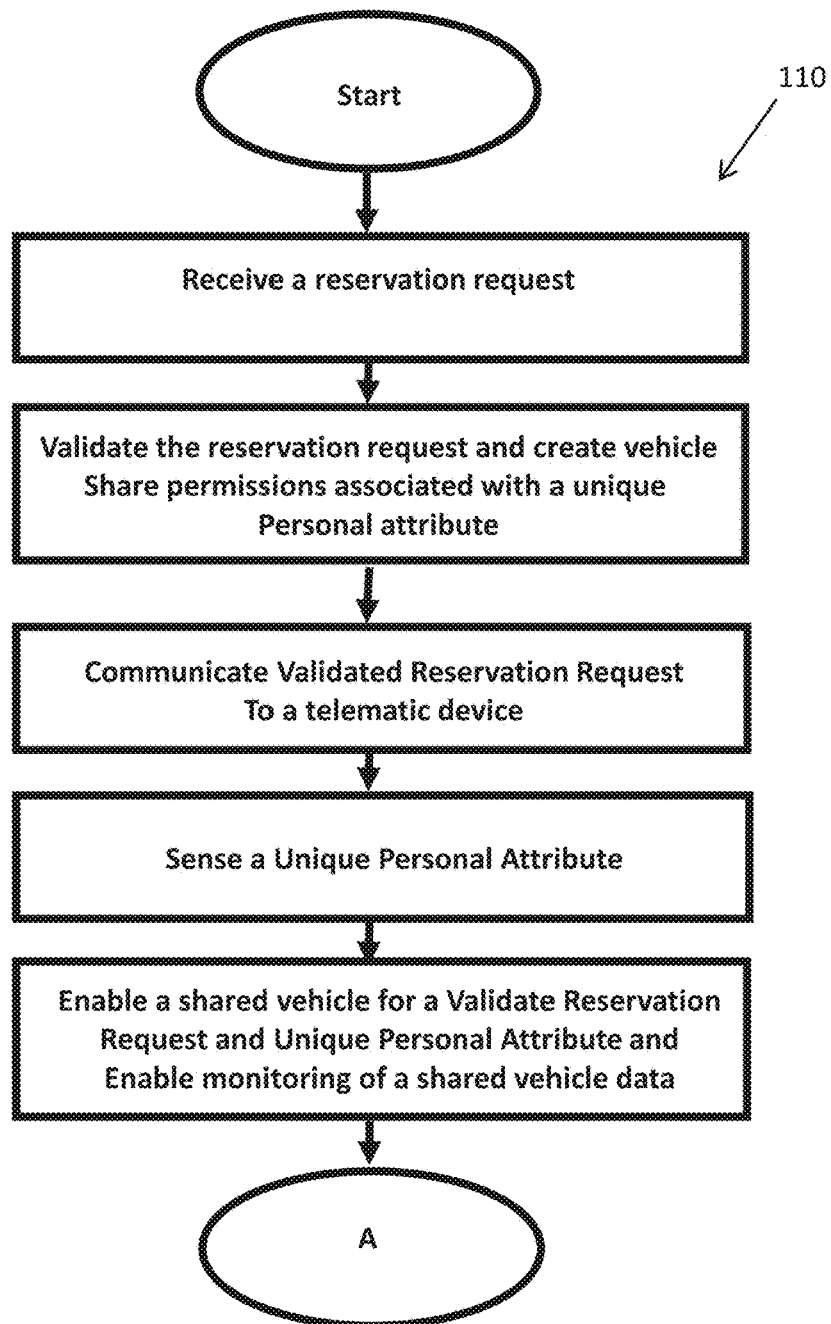
FIG. 10b is another flow chart representation of telematic vehicle sharing and monitoring.
Figure 10C:
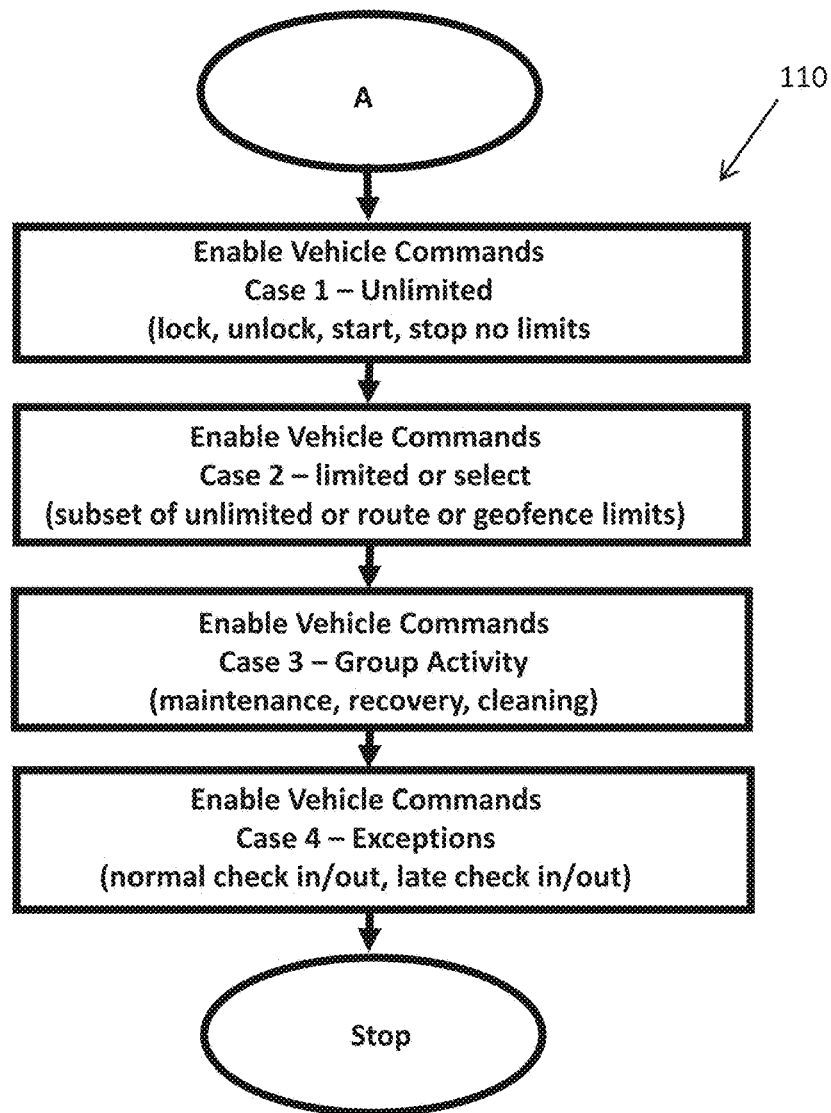
FIG. 10c is another flow chart representation of telematic vehicle sharing and monitoring.

Embodiments of vehicle sharing and vehicle share monitoring are next described with respect to FIGS. 10*a*, 10*b* and 10*c*. In FIG. 10*a*, the process 110 starts with receive reservation data. In embodiments, the process is executed in the telematics device 28 and the reservation data is received in the telematic device 28. Reservation data is contained in the reservation package and the validated and secured reservation package. The reservation data includes at least one of a unique personal attribute 20 indication, a purpose or function of use, typical or atypical start or stop locations, vehicle type of use, vehicle frequency of use, vehicle length of use, vehicle location, vehicle use left until service, next vehicle share location, permissions of use or vehicle events such as unattended asset, utilization management, maintenance or recovery. Next, the process continues with sensing for a unique personal attribute 20 in proximity to a vehicle 22 that is to be shared. Sensing may be based upon a biometric attribute, a personal attribute, a proximal attribute, or a smart device. Receive the unique personal attribute 20 data. The unique personal attribute 20 data may be biometric data, personal data, proximal data or security data based upon encryption keys. Compare and validate the unique personal attribute 20 with a portion of the reservation data and enable a defined set of vehicle controls based upon a portion of the reservation data. The vehicle controls may be limited such as unlock and lock, or route limitations or geofence limitations or unlimited. This may also include enabling a digital switch to activate vehicle certain controls in the vehicle 22 or connecting to the vehicle bus to send or receive commands to vehicle components. Next, the vehicle 22 is monitored to obtain telematic data and vehicle share data. Vehicle share data includes at least one of any serviceable vehicle parameters such as oil level, oil quality, windshield washer level, coolant level, energy/fuel at start of the reservation, energy/fuel replenishment, energy/fuel at completion of the reservation, or accurate fuel consumption. Vehicle share data may also include GPS data, start location, routes traveled, finish location, start time, idle time or finish time. Vehicle share data may also include accelerometer data indicative of driving habits such as speed or indications of an accident. Vehicle share data may also include indications towards vehicle maintenance, minor maintenance, major maintenance, energy/fuel too low, serviceable parameters low, vehicle state, odor detection for cleaning or left baggage. From the beginning of an active vehicle share reservation to the completion of a vehicle share reservation, the telematic device 28 monitors the vehicle and devices to log telematic data. Next, periodically, the telematic data and the vehicle share data is communicated to a remote device, for example the vehicle management platform 12. Alternatively, the vehicle share data is communicated to the vehicle reservation platform 10. Alternatively, the vehicle share data is communicated to both platforms. The vehicle reservation platform 10 uses vehicle share data or a portion of the data to manage vehicle reservations. The vehicle management platform 12 use the vehicle data to manage the fleet of vehicles such as maintenance and vehicle location.

In FIGS. 10*b* and 10*c*, an alternative process 110 starts with receive a reservation request. The reservation request is validated. Vehicle share permissions or limits associated with the unique personal attribute 20 that provided the reservation request are assessed. The validated reservation request, with security, is provided to a telematic device 28. The telematic device 28 senses a unique personal attribute 20. With a valid unique personal attribute and associated reservation data, vehicle share is enabled and monitoring of telematic data and vehicle share data is enabled. In one case, the enabled vehicle share commands are unlimited and include lock, unlock, start and stop without route or geofence limits. In another case, the enabled vehicle share commands are limited or select may include a subset of unlimited or route or geofence limits. In another case, the enabled vehicle share commands are a group activity an may include maintenance, or recovery, or cleaning. In another case, the enabled vehicle share commands are exceptions and may include normal check in/out, late check in/out.

Utilization Service Management

Figure 11A:
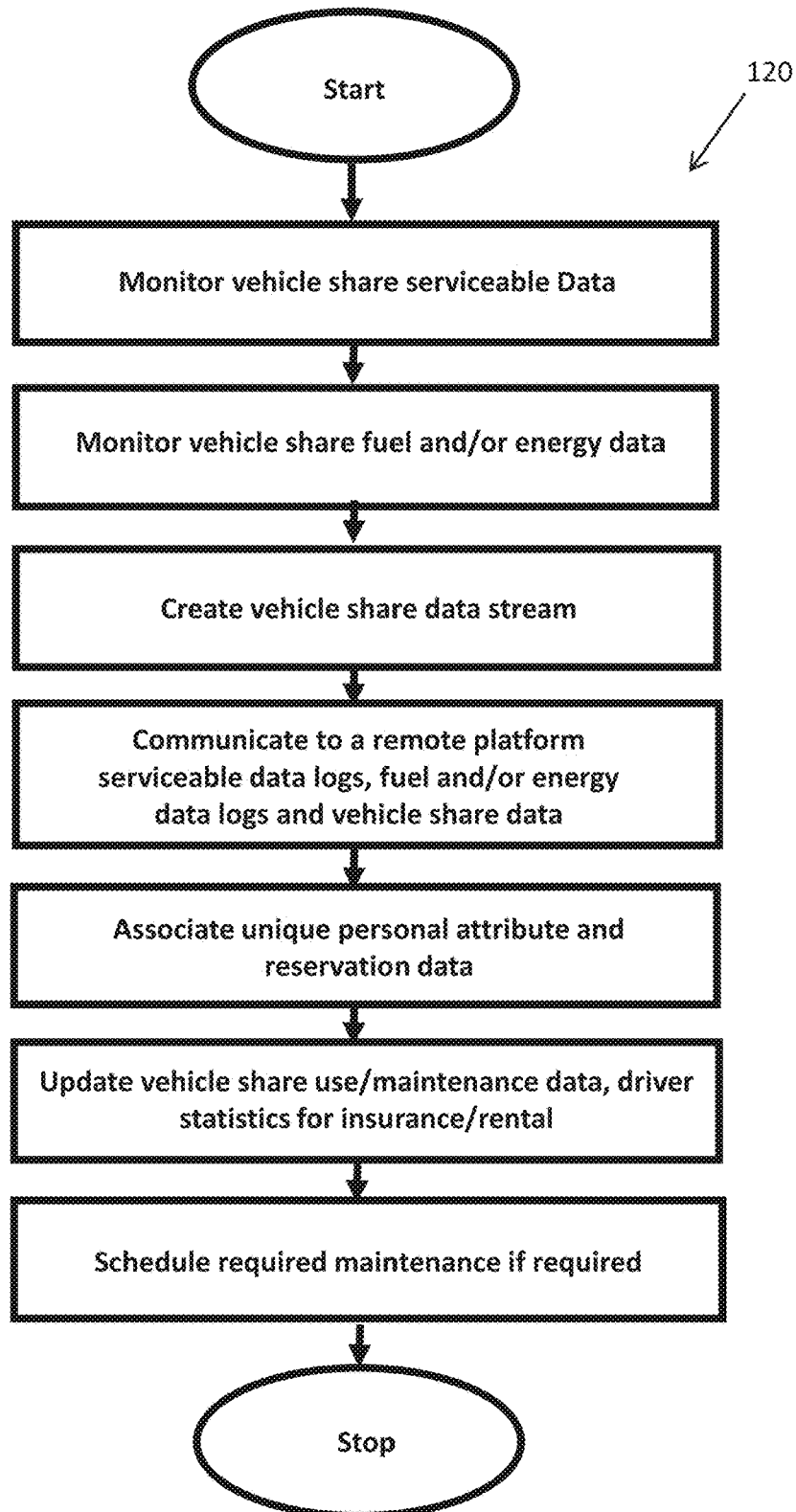
FIG. 11a is a flow chart representation of telematic vehicle share utilization service management.

Referring now to FIG. 11a, the utilization service management logic generally indicated at 120 is described. Utilization service management begins with monitoring vehicle share serviceable data which includes any serviceable vehicle parameter. Next, fuel and or energy data is also monitored. This includes fuel-based power trains, electric based power trains or hybrid-based power trains. Then, create a vehicle share data stream including vehicle serviceable data and fuel/energy data where the serviceable data logs, fuel/energy data logs and vehicle share data are communicated to a remote platform. The remote platform may be the vehicle share reservation platform 10, the vehicle shore management platform 12 or both platforms. The unique personal attribute is associated with the reservation data and the vehicle serviceable data and fuel/energy data and vehicle share data. The data is applied to update historical records such as the vehicle share data, vehicle share customer data, vehicle share use, the maintenance data, and driver statistics for insurance and future vehicle share reservations. Driver statistics include speeding, harsh events and/or an accident. The data is processed and compared to determine maintenance. For example, maintenance may be determined when fluid levels are low or if the remaining energy in a vehicle 22 is to low when compared to the needs of the reservation data such as distance required. If a determination for maintenance is required, schedule the maintenance event and corresponding vehicle share reservation. Maintenance could require moving the vehicle 22 to a maintenance facility or maintenance could require mobile maintenance to top up fluid levels or maintenance could require moving the vehicle to restore fuel/energy or maintenance could require repair or maintenance could require cleaning. The foregoing are known as maintenance events (energy maintenance event, fluid level maintenance event, accident maintenance event, energy maintenance event or recovery maintenance event). GPS data from the vehicle 22 and reservation data such as start and stop locations or parked location may also be applied to maintenance vents to optimize recovery or ferrying of the vehicle 22.

Figure 11B:
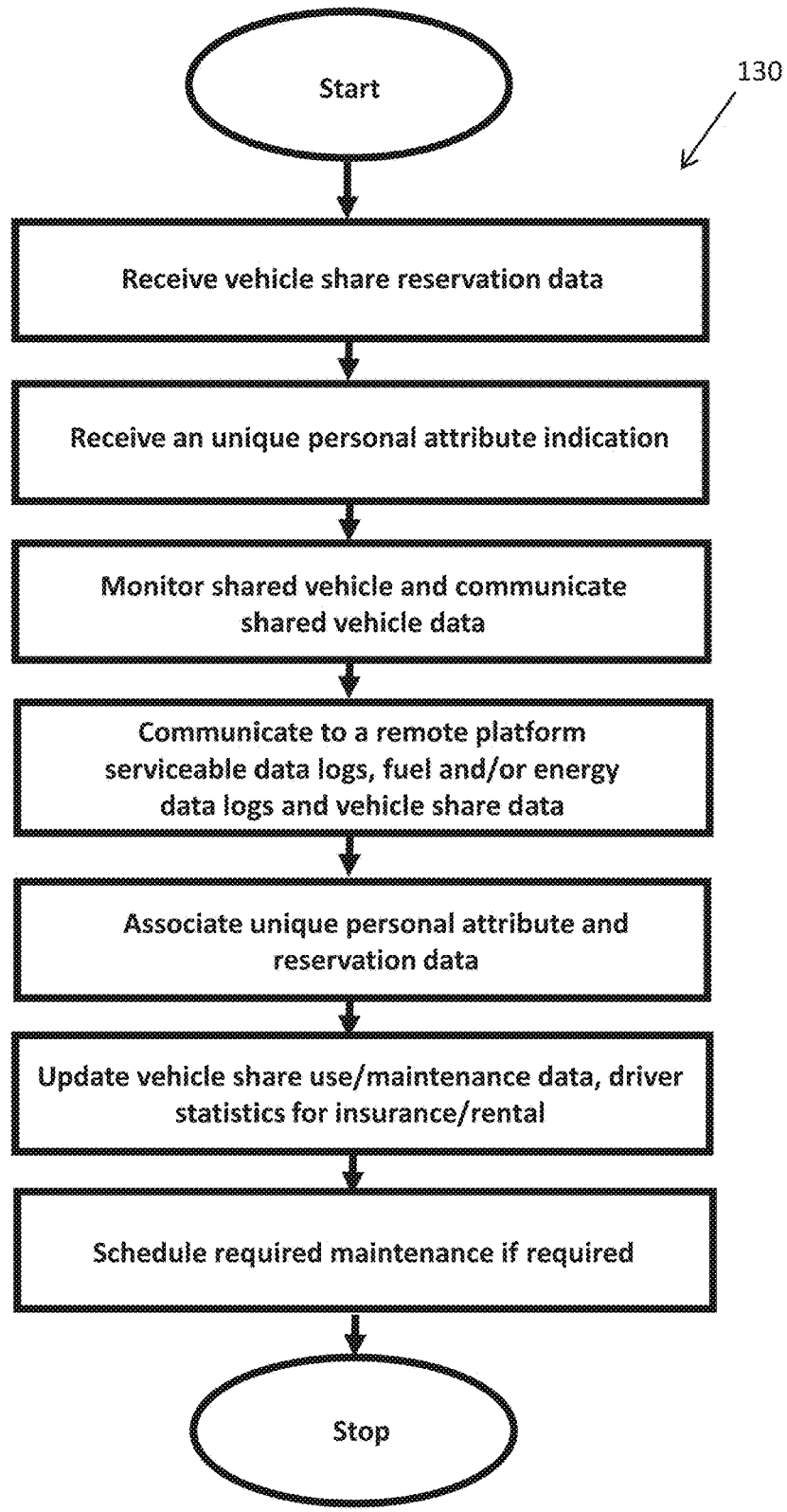
FIG. 11b is a flow chart representation of telematic vehicle share utilization service management.

Referring now to FIG. 11b, an alternative embodiment of the utilization service management is illustrated generally at 130. Vehicle share reservation and reservation data is received. Then a unique personal attribute indication is received. The shared vehicle 22 is monitored and shared vehicle data is communicated to a remote platform. This includes serviceable data logs, fuel and/or energy data logs and vehicle share data. The unique personal attribute is associated with the reservation data. The vehicle share use data, maintenance data and driver statistics are updated for use with service management, insurance management or rental maintenance. Maintenance may be scheduled if required at the completion of the shared vehicle use.

Vehicle Share Maintenance & Recovery Service Management

Figure 12:
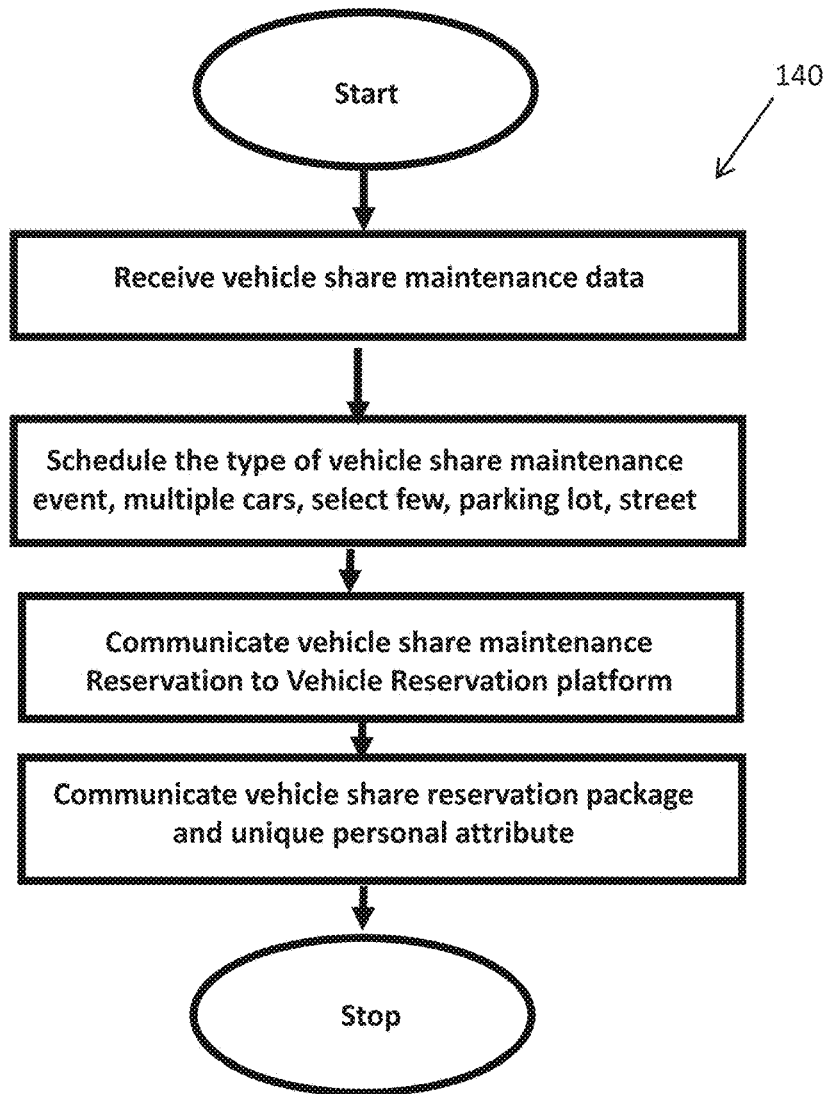
FIG. 12 is a flow chart representation of telematic vehicle share maintenance and recovery service management.
Figure 13A:
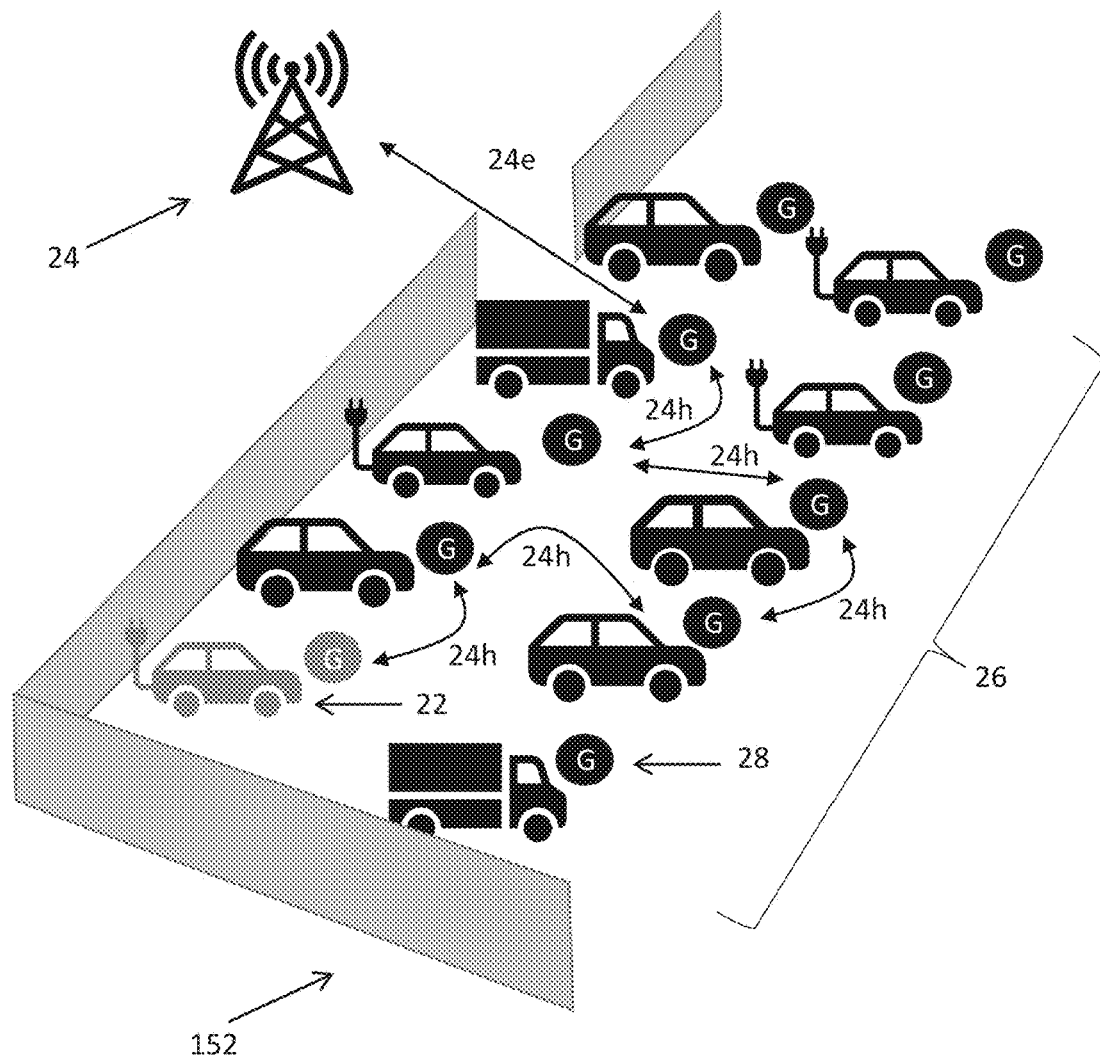
FIG. 13a is a high-level diagrammatic view of vehicle share communication management.
Figure 13B:
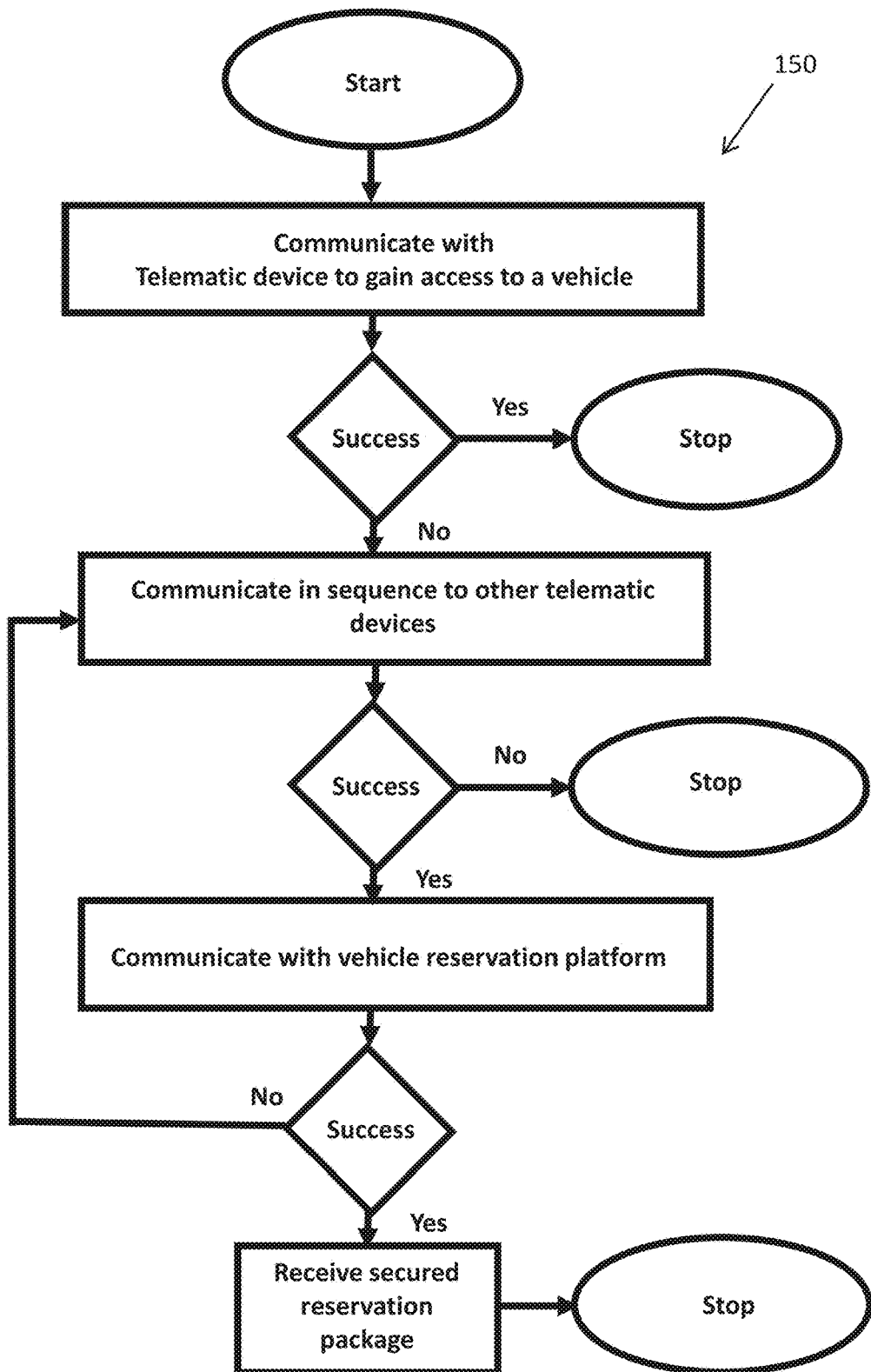
FIG. 13b is a flow chart representation of telematic vehicle share communication management.

Vehicle share maintenance and recovery service management is described with reference to FIG. 12 and is generally indicated at 140. In embodiments, the vehicle share management platform 14 receives or determines vehicle share maintenance data. Vehicle share maintenance data contains an amount of vehicle share reservation data, past, present, future, and vehicle share data. For example, the vehicle share data includes engine data such as fault codes, trouble codes, fuel/energy at start of a reservation, fuel/energy replenishment during a reservation, fuel/energy at the end of a reservation, fuel usage per distance, oil level, washer level and coolant level. The vehicle share maintenance data also includes GPS data such as the start location of a reservation, route of a reservation, finish location of a reservation, start time of a reservation, idle time of a reservation and finish time of a reservation.

The vehicle share management platform 14 processes the data to determine and schedule a vehicle share maintenance event. One vehicle share maintenance event is a cleaning event. For a cleaning event, GPS data for the vehicle finish location and GPS data for a vehicle wash facility is assessed to determine the best fit with the wash facility. Alternatively, the GPS data assessed could include GPS zones or geofences. This includes the capability of the wash facility as well as the distance. The vehicle share reservation data is also assessed so that the vehicle may be ferried within close proximity to the next vehicle share start location after cleaning. The cleaning event may also occur on location for multiple vehicles, a select few vehicles, vehicles located in a central parking lot or vehicles distributed around streets. Cleaning may occur with an unattended vehicle asset.

Another vehicle share maintenance event is an energy event. For an energy event, the vehicle share maintenance data includes GPS data for the vehicle finish location, vehicle share reservation data for the distance required, an indication to the amount of fuel/energy required, GPS data for fuel/energy stations and vehicle share data for fuel/energy at the end of the previous vehicle share reservation. Fuel/energy may be one or both of fuel or electricity dependent upon the vehicle 22. If the vehicle 22 requires fuel/energy, the next vehicle share use may be presented with an option to replenish the fuel/energy or an energy event may be required with recovery of the vehicle 22 to replenish the fuel/energy. For vehicles 22 with an electric power train, the energy event may include smart charge management. For recovery of the vehicle, a GPS location is also provided to ferry the vehicle upon completing the replenishment of fuel/energy.

Another vehicle share maintenance event is a maintenance event. In embodiments, there are two types of maintenance events, a minor maintenance event and a major maintenance event. A minor maintenance event occurs when the maintenance requires replenishment of a fluid. The vehicle share maintenance data includes vehicle share data in the form of oil level, washer level, coolant level, or tire pressure (serviceable parameters). The vehicle share maintenance data also includes vehicle share reservation data, time to next reservation and vehicle location at the end of the previous reservation. A minor maintenance event schedules maintenance at the vehicle location to replenish the various fluids or repair a flat tire before the next reservation of the shared vehicle 22. This occurs on location of the vehicle 22 and may include unattended assets. A major maintenance vent occurs with the maintenance requires substantial work or repair to the vehicle. The vehicle share maintenance data includes vehicle share data in the form of mileage, mileage remaining to maintenance, engine data or engine fault or trouble codes. This type of maintenance requires recovery and ferrying of the vehicle to a maintenance facility. The vehicle share maintenance data also include vehicle share reservation data such as the location of the vehicle and date or time of the next reservation. GPS data to the optimal service facility is also provided to schedule the major maintenance of the vehicle 22.

Another vehicle share maintenance vent is an accident event. The vehicle share maintenance data also includes vehicle share reservation data and vehicle share data and vehicle data and engine data. Accelerometer data included with the vehicle data may provide indications towards an accident. The accelerometer data may also provide indications towards the severity of an accident. The engine data such as fluid levels in combination with accelerometer data may also provide indicates into an accident event. Vehicle share data provides the location of the vehicle 22 in the form of GPS data. Reservation data provides data concerning the current reservation and may provide data concerning the next reservation. This type of maintenance requires recovery and ferrying or towing of the vehicle 22. GPS data to the optimal service facility is also provided where the vehicle 22 remains after the accident.

Depending upon the type of vehicle share maintenance event, the maintenance may be scheduled at the unattended asset or an attended asset. The maintenance may be conducted on multiple vehicles 22, a select few vehicles 22, in a parking lot or at a street location where the vehicle 22 is parked. Once the maintenance event is determined and scheduled, the vehicle share maintenance reservation and reservation data is communicated to the vehicle share reservation platform 10. Alternatively, the vehicle share maintenance reservation may be communicated to the telematic device 28. The vehicle share reservation platform 10 communicates the vehicle share reservation package, and reservation data and unique personal attribute to the telematic device 28. The reservation data also include permissions based upon the type of maintenance event. For example, with a cleaning event the permissions are unlock and lock the vehicle. For a minor maintenance event, the permissions are unlock and lock the vehicle 22. For a major maintenance event, the permissions are unlock and lock the vehicle 22, start the vehicle 22 and operate the vehicle directly to the maintenance facility. The route may be determined by the system. Alternatively, a geofence limitation may be determined by the system.

Vehicle Share Communication Management

Vehicle share communication management is described with reference to FIGS. 1a, 1b, 1c, 13a and 13b. Communication between the vehicle share reservation platform 10, the vehicle share management platform 12 and the telematic device 28 must occur to send data within the system and to a vehicle 22. In certain situations, communication may be impeded such as in a multi-level parking garage 152 or in other situations where the telematics device 28 in a particular vehicle 22 from a fleet of vehicles 26 cannot make a connection to the network for communication. To overcome these situations, the telematics device 28 may attempt to connect to neighboring telematic devices 28 in a sequence of communications 24h until a communication 24e connection is established with the network. Alternatively, the telematics device 28 in the vehicle 22 may attempt to connect to neighboring communication devices until a communication is established with the network.

Vehicle share communication management 150 begins with an attempt to communicate or sense a unique personal attribute 20 with a telematic device 28 for access to the vehicle 22. If the telematic device 28 does not have a vehicle share reservation package and associated reservation data for the unique personal attribute 20 and the telematic device 28 cannot establish communication to the network 24, then the telematic device 28 will attempt to communicate in a random sequence to other telematic devices 28 to establish a connection to the network 24. The telematic devices 28 may also attempt to establish a connection to the network through other devices and forms of communication such as satellite, WIFI, hotspots, Bluetooth or cellular. Once a connection to the network 24 has been accomplished, the telematic device 28 connects to the vehicle share reservation platform 10 to receive the secured reservation package and associated reservation data. Then based upon the unique personal attribute 20 access to the vehicle may be granted for the reservation.

Vehicle Share Misuse Management

Figure 14A:
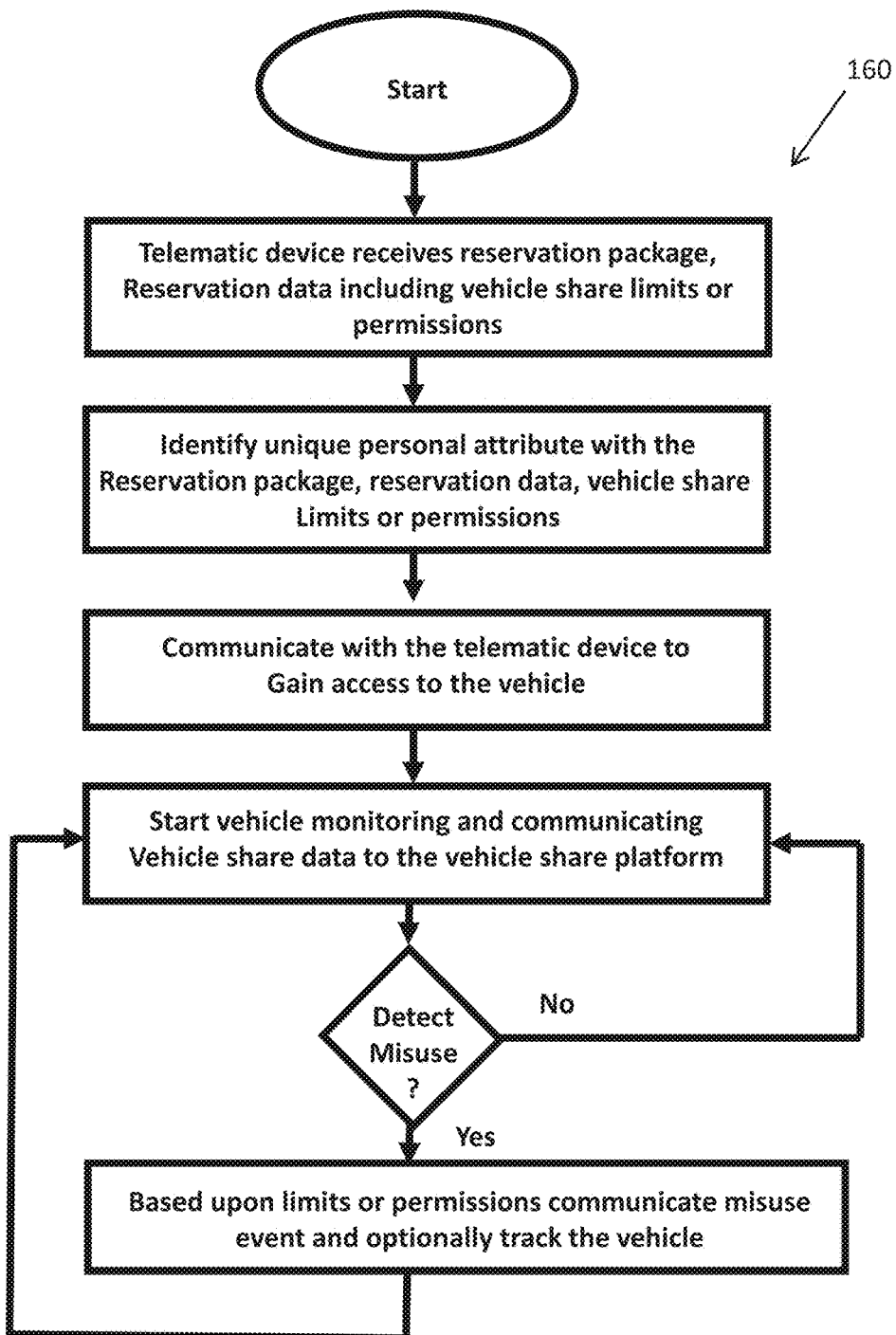
FIG. 14a is a flow chart representation of telematic vehicle share misuse management.
Figure 14B:
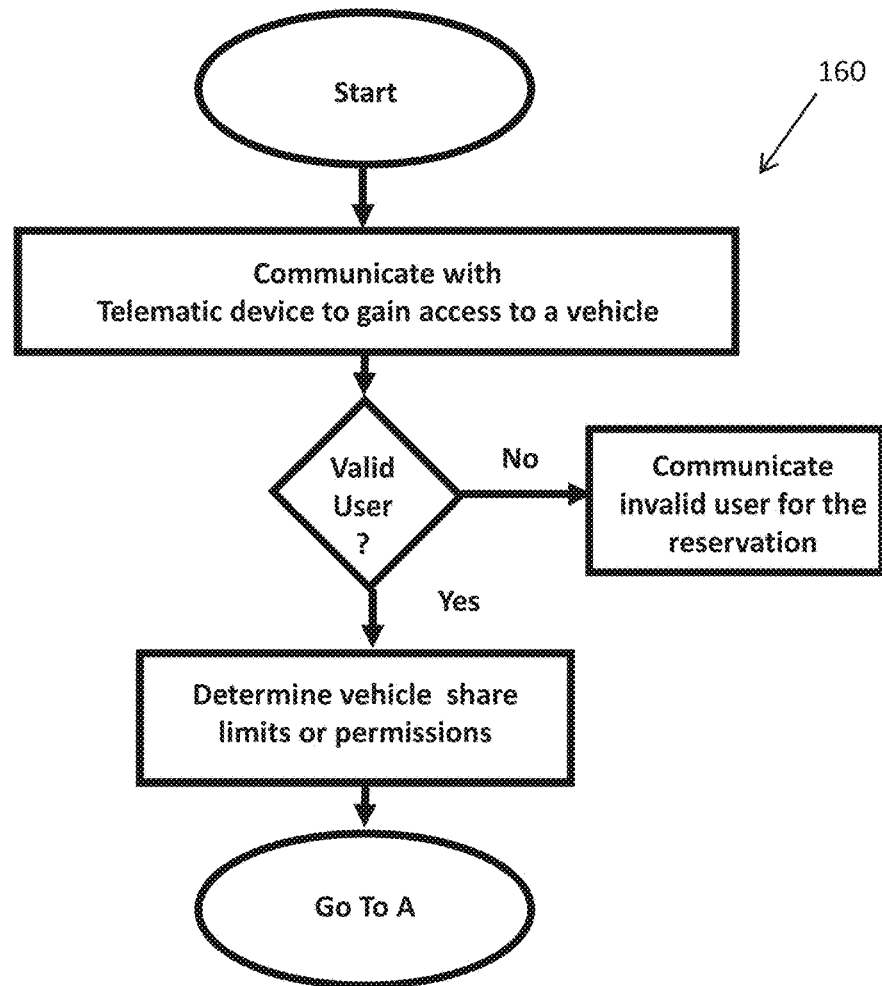
FIG. 14b is a flow chart representation of telematic vehicle share misuse management.
Figure 14C:
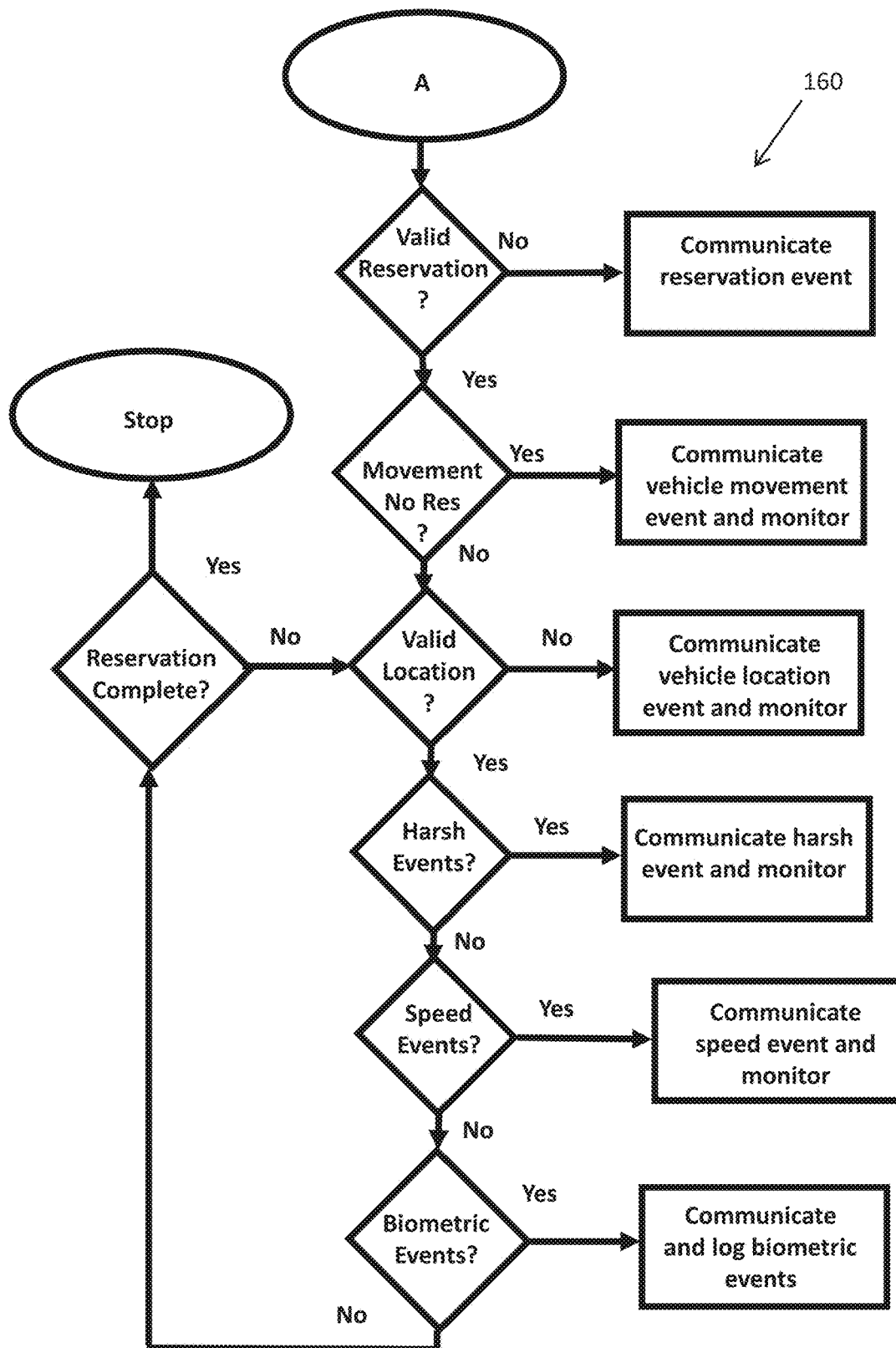
FIG. 14c is a flow chart representation of telematic vehicle share misuse management.

Vehicle share misuse management is described with reference to FIGS. 14a, 14b and 14c. There are a number of different misuse events. For example, there may be an invalid user, invalid reservation, invalid driver, movement, location, harsh, speed, geofence, biometric or routing misuse events. There may also be thresholds associated with misuse events such a location threshold, harsh thresholds, speed thresholds geofence thresholds or routing thresholds. When a value is exceeding a threshold, it may trigger communication of telematic data or vehicle share data. Vehicle share misuse management is generally indicated at 160. In an embodiment, the telematic device 28 receives a reservation package, with reservation data and vehicle share limits or permissions. Examples of permissions include valid user identified through a unique personal attribute 20, valid reservation and valid location. Examples of limits include speed limits, harsh operation of the vehicle, geofence limits or route limits. In addition, unauthorized movement may be detected when the vehicle is moved without a valid or identified unique personal attribute 20.

A user is identified through the unique personal attribute 20 when compared with the reservation package and reservation data. The identified user then has access to the vehicle 22 for operation and use of the vehicle 22 within the vehicle share limits or permissions. For a valid user, communication proceeds with the telematic device 28 to gain authorized access to the vehicle 22.

The vehicle is then monitored and the vehicle share data and vehicle data are communicated to the vehicle share platform 10. Either the telematic device 28 or the vehicle share platform 10 may detect misuse of the vehicle outside of the defined limits or defined permissions. When this occurs, a misuse event is communicated and the vehicle may be tracked for example, when the misuse event is movement by an authorized user or movement without an active reservation providing an auto-detect indication towards theft.

In other embodiments, vehicle share misuse management 160 begins with communication to the telematic device to gain access to a vehicle 22. The unique personal attribute 20 is checked with the reservation data to determine a valid user for a reservation. If not, an invalid user event is communicated to the vehicle share reservation platform 10. Additionally, if there is vehicle movement sensed by the accelerometer in the telematic device 28, then a movement event is communicated to the vehicle share reservation platform 10 and the vehicle 22 is tracked by the telematic device 28.

Vehicle share limits or permissions are determined from the reservation data. A valid reservation is determined for a unique personal attribute 20 and the reservation data. If there is no match when comparing the data communicate a reservation event to the vehicle share reservation platform 10 for corrective action to the reservation package.

A valid movement is determined for a unique personal attribute 20, the reservation data and accelerometer data from the telematics device. If movement is sensed from the accelerometer without a valid reservation or a valid unique personal attribute 20, then communicate a vehicle movement event to the vehicle share reservation platform 10 and monitor the vehicle 22 with the GPS to track and communicate the location of the vehicle.

A valid location is determined when the GPS current location of the vehicle 22 is outside a GPS or geofence limit usage area associated with the reservation data. When the vehicle 22 is outside the limit, communicate a vehicle location event and monitor the vehicle 22. The limit may also be a threshold such as a few feet to several feet or graduated to indicate a degree of the vehicle 22 being outside the limit.

A harsh event is determined when the accelerometer provides an indication above defined thresholds. The defined thresholds relate to harsh braking, harsh cornering and harsh acceleration. The thresholds are typically a g-force value relating to the accelerometer data and vary dependent upon braking versus cornering and acceleration. The thresholds may also be graduated to indicate the degree of a harsh event. When a harsh event is determined, communicate a harsh event and monitor the vehicle 22.

A speed event is determined when the telematic device or the GPS device provide an indication above a defined threshold. The defined threshold could be based upon speed limits associated with the route or a maximum speed limit. The speed thresholds may also be graduated to indicate the degree of a speed event such as a minor or major speed violation. When a speed event is determined, communicate a speed event and monitor the vehicle 22.

A biometric event is determined through biometric sensors located in the vehicle 22 and communication with the telematics device 28. In an embodiment, the biometric sensors are connected to interface of the second portion 23. Facial recognition may provide an indication to a valid driver irrespective of the unique personal attribute 20. A vision system may provide an indication to a messy vehicle or articles left after the completed reservation. Odor may be detected though an odor system to provide an indication requiring the vehicle 22 to be cleaned before the next reservation. When a biometric event is determined, the category of biometric event is communicated to the vehicle share reservation platform 10 as well as the vehicle share management platform 12 when maintenance may be required based upon the biometric event.

Vehicle Share Storage Management

Figure 15:
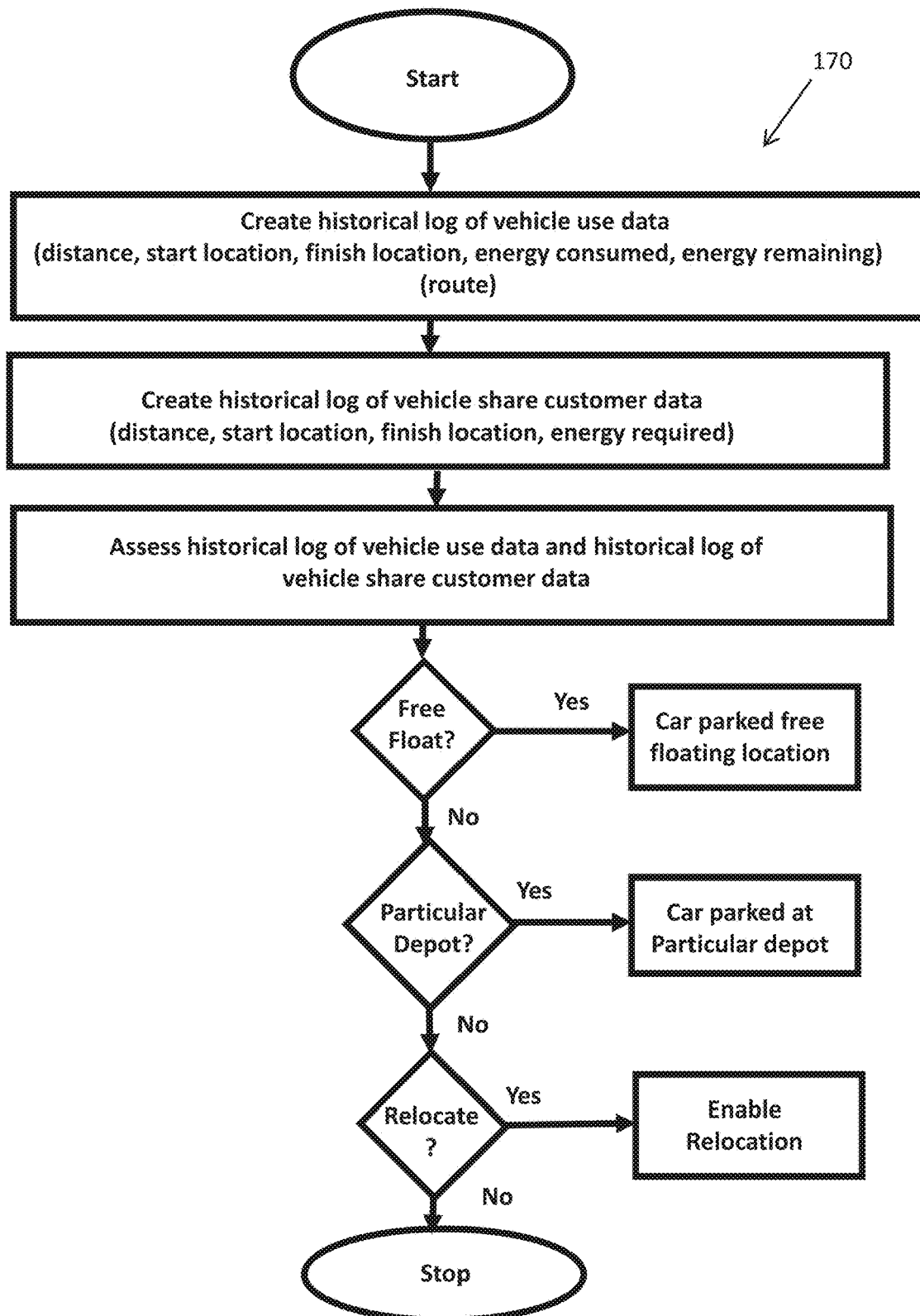
FIG. 15 is a flow chart representation of telematic vehicle share storage management.

Vehicle share storage management is described with reference to FIG. 15. Vehicle share storage management attempts to align the locations of the fleet or select vehicles 22 in the fleet with the needs of the vehicle share users to prevent unnecessary ferrying of the vehicles 22. The location of the vehicles, proposed route of the vehicles are applied to stored vehicle locations. The vehicle 22 could be free floating and parked anywhere within a geofence areas. The vehicle 22 could be stored at a particular vehicle depot. The vehicle 22 could require a relocation that could be provided through a service provider or incentives to the users of vehicle share. Vehicles could be placed at key locations at the end of the day or based upon frequency of use, one depot could have more vehicles on a Monday versus a Tuesday for selectively ensuring vehicles are dynamically in better locations dependent upon the user demand.

A historical log of vehicle data and vehicle share data is created and accessible for vehicle share storage management. The historical log may include distance, start location, finish location, energy consumed, energy remaining or route. A historical log of vehicle share customer data is created and accessible for vehicle share storage management. The historical log may include start location, distance, finish location, energy required, routes, and locations. The vehicle use data and the vehicle share customer data are compared and assessed to determine the best match between customers and locations of parked vehicles 22. For example, the comparison may be energy related to the comparison may be location related, or route related or a combination. The best match is an acceptable distance between the customers location and the location of the parked vehicle 22. A threshold distance may be applied to indicate a best match or an acceptable or an unacceptable match. The threshold distance may be graduated to provide an indication towards the match (poor, good, excellent). A free float case provides a dynamic parking area for a vehicle 22 and will vary from reservation to reservation. This is dependent upon the needs of the users from the current reservation to the next reservation over a period of time. The vehicle 22 is parked at different locations and different users pick up the vehicle 22 to share the vehicle 22. It's a best match between multiple users and multiple locations for a parked vehicle 22. A particular depot case provides a central location for parked vehicles 22. With this case, the users pick up and drop off at the particular depot. Alternatively, the drop off could be for a free float case. A relocate case covers the situation where the vehicle 22 must be relocated to another free float location or a central depot. The goal is to minimize movement of the fleet or in the case of vehicles 22 with electric drivetrain, provide a location with infrastructure suitable for recharging the vehicle 22. Vehicle share storage management may be performed on a vehicle share analytics platform 14.

Vehicle Share Procurement Management

Figure 16:
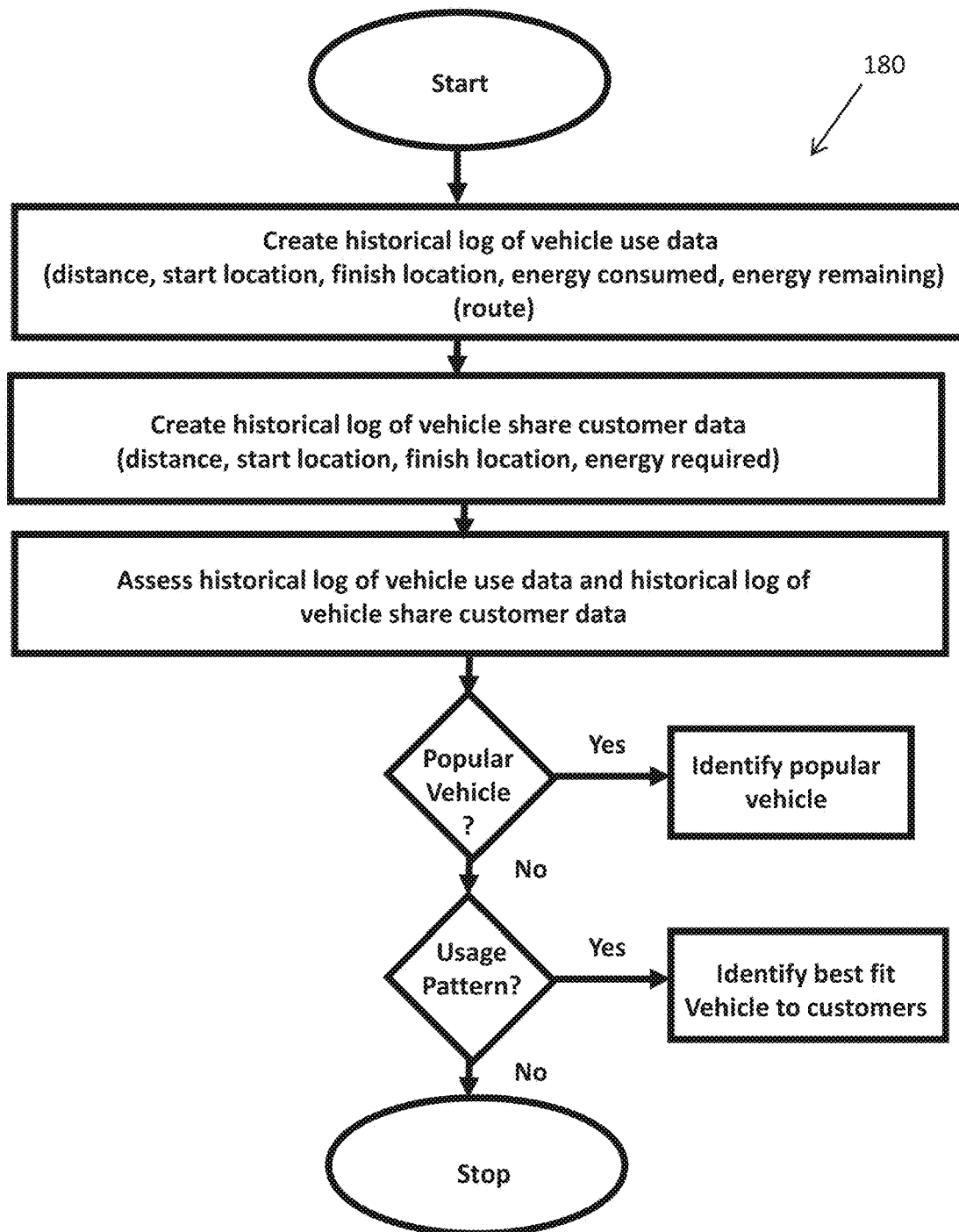
FIG. 16 is a flow chart representation of telematic vehicle share procurement management.

Vehicle share procurement management is described with reference to FIG. 16. Vehicle share procurement management attempts to identify vehicles for sharing based upon historical telematic data, historical vehicle share data, and historic customer vehicle share data. This optimizes vehicle procurement for vehicle sharing based upon selection patterns, use patterns and popular vehicles shared for specific types of sharing. The system considers the year, location, range and usage of a vehicle 22, driving habits and frequency. New vehicle information and data is used when comparing to the customer vehicle share data. A historical log of vehicle use data is created and accessible for vehicle share procurement management. In addition to the aforementioned data, distance, location data, energy data and route data may be included. A historical log of vehicle share customer data is created and accessible for vehicle share procurement management. The historical logs are accessed and assessed to compare vehicle use data with vehicle share customer data. Processing may be performed on a vehicle share analytics platform 14 to determine and identify either the most popular vehicle in the fleet or identify the best fit of a vehicle to a customer based upon usage patterns concerning the data.

Vehicle Share Selection Management

Figure 17:
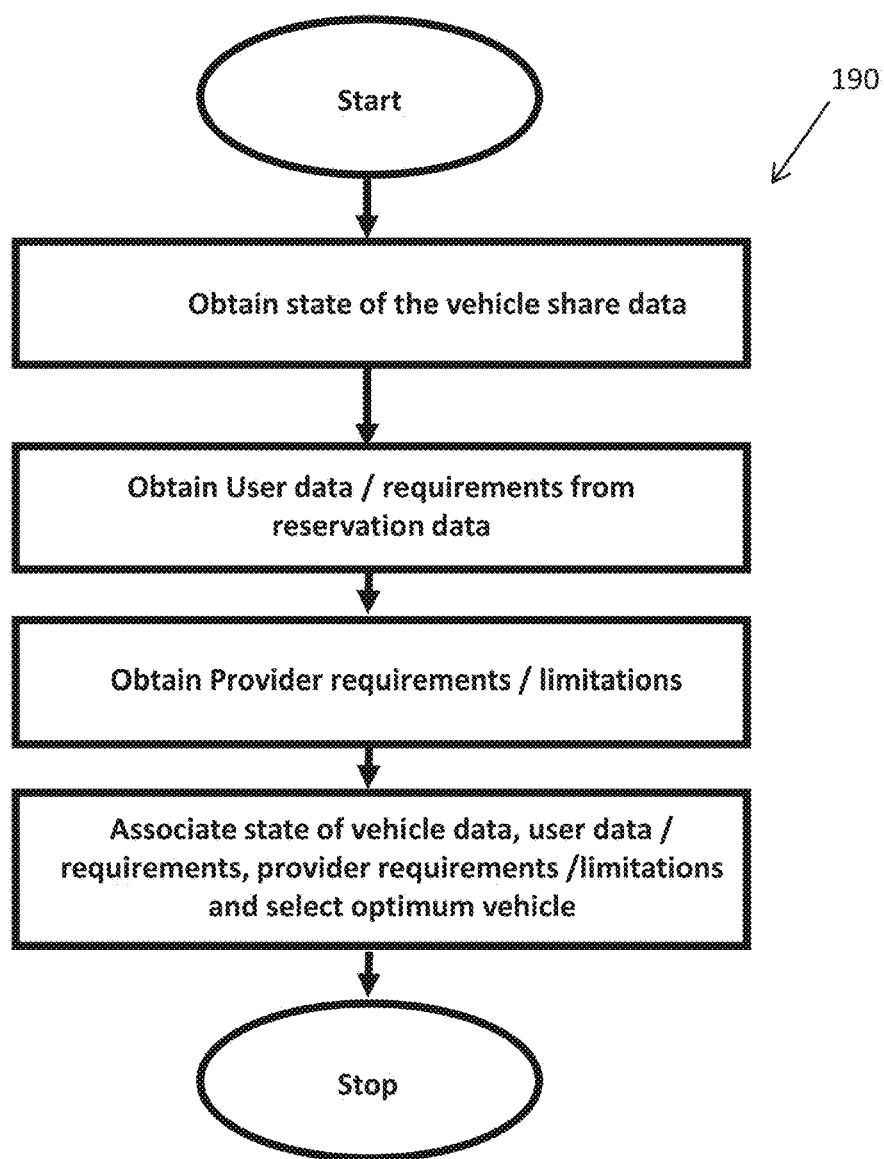
FIG. 17 is a flow chart representation of telematic vehicle share vehicle selection management.

Referring now to FIG. 17, vehicle share selection management is described and generally indicated at 190. Vehicle share selection management attempts to select the optimum vehicle for a user. The vehicle state may be determined from the vehicle share data or the historical vehicle share data. The user requirements may be obtained from the reservation data. Manufacturer requirements and limitations may be determined and validated against the vehicle share data or the historical vehicle share data. Data processing associates the state of the vehicle, user requirements, validated manufacturer requirements and limits to provide an optimum vehicle recommendation.

TECHNICAL EFFECTS

Embodiments described herein provide one or more technical effects and improvements to a telematic vehicle share ecosystem and the underlying technology components. For example, an ability to access a shared vehicle through a unique personal attribute that may take on many different forms (personal device, biometric detection, proximity detection); a telematics device primarily monitoring, logging and communicating telematic data, a telematics vehicle share I/O expander supporting the telematics device but primarily providing vehicle share functionality; flexible multiple interfaces between the telematics device and/or the vehicle share I/O expander for interfacing with the vehicle bus of a vehicle for access to vehicle data and/or limited control of predefined vehicle functions; reservation packages and reservation data that is secured and pertains to aspects of the reservation; vehicle share data that pertains to aspects of the vehicle in operation during a reservation; a vehicle share reservation platform focused on aspects of vehicle reservations; a vehicle share management platform focused on aspects of vehicle share maintenance; telematic vehicle share utilization management; telematic vehicle share maintenance and recovery management; telematic vehicle share communication management; telematic vehicle share misuse management; telematic vehicle share storage management; telematic vehicle share procurement management; and telematic vehicle share selection management.

It should be understood that aspects are described herein with reference to certain illustrative embodiments. The illustrative embodiments described herein are not necessarily intended to show all aspects, but rather are used to describe a few illustrative embodiments. Thus, aspects described herein are not intended to be construed narrowly in view of the illustrative embodiments. In addition, it should be understood that certain features disclosed herein might be used alone or in any suitable combination with other features.

The invention claimed is:

1. A method for shared vehicle utilization management comprising:
receiving in a telematic device of a vehicle from a vehicle share platform a vehicle share reservation;
subsequent to said receiving said vehicle share reservation, receiving an indication of a unique personal attribute capable to be associated with said telematic device and said vehicle;
initiating an active vehicle reservation;
from a beginning of said active vehicle reservation to a completion of said active vehicle reservation, monitoring said shared vehicle and communicating shared vehicle data to said vehicle share platform; and
processing on said vehicle share platform said shared vehicle data with reservation data for providing shared vehicle management for a future shared vehicle thereby determining a match for an available vehicle for said future shared vehicle associated with at least one unique personal attribute,
wherein said telematic device includes a vehicle share portion, wherein said vehicle share portion includes a microprocessor, memory and firmware configured to interface with an electronic vehicle key device, the electronic vehicle key device having a button, wherein the microprocessor performs a health check whereby the microprocessor:
ensures power to the electronic vehicle key device is off;
thereafter enables a pull-up resistor;
determines if a line cannot be pulled to a high state;
disables the pull-up resistor;
checks whether the line was supposed to be connected based on a stored button configuration of the electronic vehicle key device; and
reports a fault if required.

2. A method for shared vehicle utilization management as in claim 1 wherein said indication is a biometric indication.

3. A method for shared vehicle utilization management as in claim 2 wherein said biometric indication is selected from the group consisting of a face, a fingerprint, an eye or voice relating to said unique personal attribute.

4. A method for shared vehicle utilization management as in claim 1 wherein said indication is a proximal indication.

5. A method for shared vehicle utilization management as in claim 4 wherein said proximal indication is one of a RFID tag or proximity card relating to said unique personal attribute.

6. A method for shared vehicle utilization management as in claim 1 wherein said indication is a personal device indication.

7. A method for shared vehicle utilization management as in claim 6 wherein said personal device indication is selected from the group consisting of a smart phone, a smart watch, a smart fob or a vehicle share app installed on a smart device.

8. A method for shared vehicle utilization management as claim 1 wherein said shared vehicle data is selected from the group of speed data, location data, accelerometer data or engine data.

9. A method for shared vehicle utilization management as in claim 8 wherein said shared vehicle data provides indications of vehicle use and said indications of vehicle use are associated with said unique personal attribute.

10. A method for shared vehicle utilization management as in claim 9 wherein said shared vehicle data is selected from the group of fluid level data, energy level data or location data.

11. A method for shared vehicle utilization management as in claim 1 further including:
receiving said reservation data, said reservation data including at least one of a purpose of vehicle use, preferred start location, preferred stop location, vehicle type, length of use, distance required, energy required or parked location.

12. A method for shared vehicle utilization management as in claim 1 wherein said shared vehicle data includes at least one of energy at start of said active vehicle reservation, energy replenishment, energy at completion of said active vehicle reservation, actual start location, actual stop location or fluid levels.

13. A method for shared vehicle utilization management as in claim 1 further including:
    receiving said reservation data, said reservation data having at least one of a purpose of vehicle use, preferred start location, preferred stop location, vehicle type, length of use, distance required, energy required or parked location; and
    said shared vehicle data having at least one of energy at start of said active vehicle reservation, energy replenishment, energy at completion of said active vehicle reservation, actual start location, actual stop location or fluid levels.

14. A method for shared vehicle utilization management as in claim 13 further including:
    processing said preferred start location and said actual location to determine said match, and said match is a best match based upon location data.

15. A method for shared vehicle utilization management as in claim 13 further including:
    processing said energy at completion of said active vehicle reservation and said distance required to determine said match, and said match is a best match based upon energy data.

16. A method for shared vehicle utilization management as in claim 13 further including:
    processing said start location and said actual location with a threshold to determine said match, and said match is an acceptable match based upon location data.

17. A method for shared vehicle utilization management as in claim 16 further including:
    providing a vehicle share incentive with said acceptable match.

18. A method for shared vehicle utilization management as in claim 13 further including:
    processing said distance required and said energy at completion of a reservation to determine said match, and said match is an acceptable match based upon energy data.

19. A method for shared vehicle utilization management as in claim 18 further including:
    providing a vehicle share incentive with said acceptable match.

20. A method for shared vehicle utilization management as in claim 1 wherein the electronic vehicle key device has a button configuration where either end of the button is a high or low value, wherein the microprocessor performs an actuation validation process where a button-depressed or a button-released condition is monitored without a need to know an actual hardware configuration of the electronic vehicle key device.

* * * * *